(12) United States Patent
Ninomiya et al.

(10) Patent No.: US 11,934,020 B2
(45) Date of Patent: Mar. 19, 2024

(54) OPTOELECTRONIC CONNECTIONS TO PRINTED CIRCUIT BOARDS

(71) Applicant: Senko Advanced Components, Inc., Marlborough, MA (US)

(72) Inventors: Takuya Ninomiya, Natick, MA (US); Jeffrey Gniadek, Oxford, ME (US); Yim Wong, Kowloon (HK); Tyler Royer, York, PA (US)

(73) Assignee: Senko Advanced Components, Inc., Hudson, MA (US)

( * ) Notice: Subject to any disclaimer, the term of this patent is extended or adjusted under 35 U.S.C. 154(b) by 0 days.

(21) Appl. No.: 17/669,438

(22) Filed: Feb. 11, 2022

(65) Prior Publication Data

US 2022/0260791 A1    Aug. 18, 2022

Related U.S. Application Data

(60) Provisional application No. 63/234,533, filed on Aug. 18, 2021, provisional application No. 63/180,549, filed on Apr. 27, 2021, provisional application No. 63/179,180, filed on Apr. 23, 2021, provisional application No. 63/178,794, filed on Apr. 23, 2021, (Continued)

(51) Int. Cl.
*G02B 6/38* (2006.01)
*G02B 6/42* (2006.01)

(52) U.S. Cl.
CPC ......... *G02B 6/3885* (2013.01); *G02B 6/3897* (2013.01); *G02B 6/4261* (2013.01)

(58) Field of Classification Search
CPC .. G02B 6/3885; G02B 6/3897; G02B 6/4261; G02B 6/4292; G02B 6/38
See application file for complete search history.

(56) References Cited

U.S. PATENT DOCUMENTS

| 4,721,358 A | 1/1988 | Faber et al. |
| 6,736,546 B2 | 5/2004 | Kiani et al. |
| 10,284,323 B2 | 5/2019 | Salsi |

(Continued)

FOREIGN PATENT DOCUMENTS

| CN | 113109905 B | 4/2023 |
| WO | 2012017262 | 2/2012 |

(Continued)

OTHER PUBLICATIONS

International Search Report and Written Opinion of the International Searching Authority issued for PCT/US2022/16076, dated Aug. 1, 2022, 11 pages.

*Primary Examiner* — Jennifer Doan

(57) ABSTRACT

An optoelectronic module and optoelectronic connector assemblies can be used for releasable connection of a laser source to the module from a location exterior to the module. The construction of the optoelectronic connector assemblies is such that both in connection and disconnection, the electrical contacts are broken before the optical contacts so that the laser may power down before the optical connection is broken. The optoelectronic connection assemblies have blind mating features. Some versions are free of any latching or mechanical interconnection of the optoelectronic connector assemblies to each other. A spring has a construction which permits it to be received onto a cable by lateral movement of the spring.

20 Claims, 35 Drawing Sheets

Related U.S. Application Data provisional application No. 63/148,892, filed on Feb. 12, 2021.

(56) References Cited

U.S. PATENT DOCUMENTS

| | | | |
|---|---|---|---|
| 11,121,776 B2 | 9/2021 | Aboagye et al. | |
| 2008/0219626 A1* | 9/2008 | Durrant | G02B 6/4204 385/88 |
| 2011/0081119 A1* | 4/2011 | Togami | G02B 6/4253 385/92 |
| 2018/0356601 A1 | 12/2018 | Gniadek | |
| 2020/0183097 A1 | 6/2020 | Chang et al. | |

FOREIGN PATENT DOCUMENTS

| | | |
|---|---|---|
| WO | 2012017262 A1 | 2/2012 |
| WO | 2021177463 | 9/2021 |
| WO | 2021177463 A1 | 9/2021 |
| WO | 2023286455 A1 | 1/2023 |

\* cited by examiner

OPTOELECTRONIC CONNECTIONS TO PRINTED CIRCUIT BOARDS

CROSS-REFERENCE TO RELATED APPLICATIONS

This application is a nonprovisional of U.S. Provisional Application No. 63/148,892, filed Feb. 12, 2021, and claims priority to U.S. Provisional Application No. 63/234,533, filed Aug. 18, 2021, U.S. Provisional Application No. 63/180,549, filed Apr. 27, 2021, U.S. Provisional Application No. 63/179,180, filed Apr. 23, 2021 and Provisional Application No. 63/178,794, filed Apr. 23, 2021, the disclosures of each of which are incorporated herein in their entireties by reference.

BACKGROUND

Optical data transmission systems require interface with electronic systems for the receipt and transmission of data. Moreover, at some locations it is necessary to provide an optical source. Typically, this takes the form of a laser. The laser can be provided in a relatively small format. However, connection of the laser to optoelectronic modules occupies valuable space needed for optical communication lines. It is known to place the laser within the module, but should the laser need to be replaced, the entire module must be replaced. In some circumstances it is known to attach the laser on the exterior of the module, but two connections are required, which occupies valuable space for connections on the exterior of the module.

SUMMARY

In one aspect of the present invention, an optoelectronic connection system generally comprises a first connector assembly including a first electrical contact, a ferrule holder, and a first multi-fiber ferrule supported by the ferrule holder. A second connector assembly includes a housing configured mate with the first connector assembly for connection to the second connector assembly. Optical fibers in the housing are configured for optical connection with the first multi-fiber ferrule. A second electrical contact is configured to electrically connect with the first electrical contact upon connection of the first and second connector assemblies. The first and second multi-fiber ferrules are arranged relative to the first and second electrical contacts so that upon connection of the first connector assembly with the second connector assembly, the first multi-fiber ferrule makes an optical connection with the optical fibers of the second connector assembly prior to the first and second electrical contacts making an electrical connection.

In another aspect of the present invention, an optical connector generally comprises first and second mechanical transfer ferrules. A ferrule holder is formed for holding the first and second mechanical transfer ferrules in side-by-side relation with each other. The ferrule holder is configured to admit cables containing optical fibers into the ferrule holder for each of the first and second mechanical transfer ferrules.

In yet another aspect of the present invention, an optoelectronic module generally comprises a housing including an interior and an exterior, with the exterior of the housing being configured for receiving plug-in connections. A printed circuit board in the housing includes an optical engine mounted thereon. A receptacle connector assembly is mounted on the circuit board in the interior of the housing. The receptacle connector assembly is configured for making optical plug-in connection to a laser light source from the exterior of the housing into the interior of the housing, and for making an electrical plug-in connection to the laser light source from the exterior of the housing.

In still a further aspect of the present invention, an optoelectronic module generally comprises a housing having a port therein. A printed circuit board is in the housing. An optical engine in the housing is configured to use laser light for driving optoelectronic communication with the housing. A receptacle connector assembly in the housing and connected to the printed circuit board, the receptacle connector assembly is exposed for connection through the port. A laser source is configured to be optically and electrically connected to the printed circuit board and optical engine by connection to the receptacle connector assembly. The laser source and receptacle connector assembly have blind mate features configured to facilitate connection of the laser source to the to the receptacle connector.

Other objects and features of the present invention will be in part apparent and in part pointed out hereinafter.

DESCRIPTION OF THE DRAWINGS

FIG. 34 is an enlarged, fragmentary perspective of the plug-in connector assembly of the optoelectronic connection system of. FIG. 33 with a near side wall removed to show internal construction;

Corresponding reference characters indicate corresponding parts throughout the several view of the drawings.

DETAILED DESCRIPTION

Figure 1:
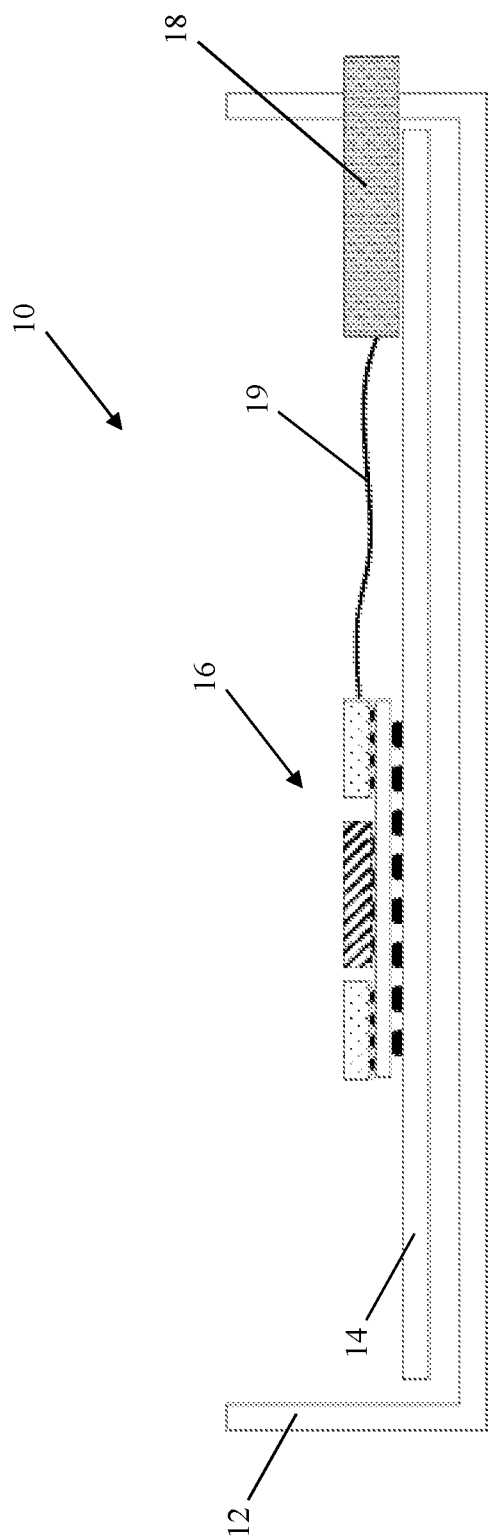
FIG. 1 is a schematic sectional view of an optical switch module including a pluggable external laser source connector.

Referring now to the drawings, an optical switch module indicated generally at 10 is shown to comprise a housing 12 containing a printed circuit board 14 and an optical engine 16 mounted on the circuit board. The optical engine 16 that can be powered by external laser sources, such as the external laser source (ELS) 18 shown in FIG. 1. The external laser source is connected to the optical engine by an optical conductor 19. The construction and operation of optical switch modules is well understood by those of ordinary skill in the art, and will not be further described in detail herein. Moreover, it will be understood that the module can be other than an optical switch module and that the connection systems disclosed herein have application in contexts other than printed circuit board connections. In the illustrated embodiment, the external laser source 18 can be plugged into the optical switch module 10. This facilitate replacement of the ELS though a releasable, plug-in connection, as will be described hereinafter.

Figure 2:
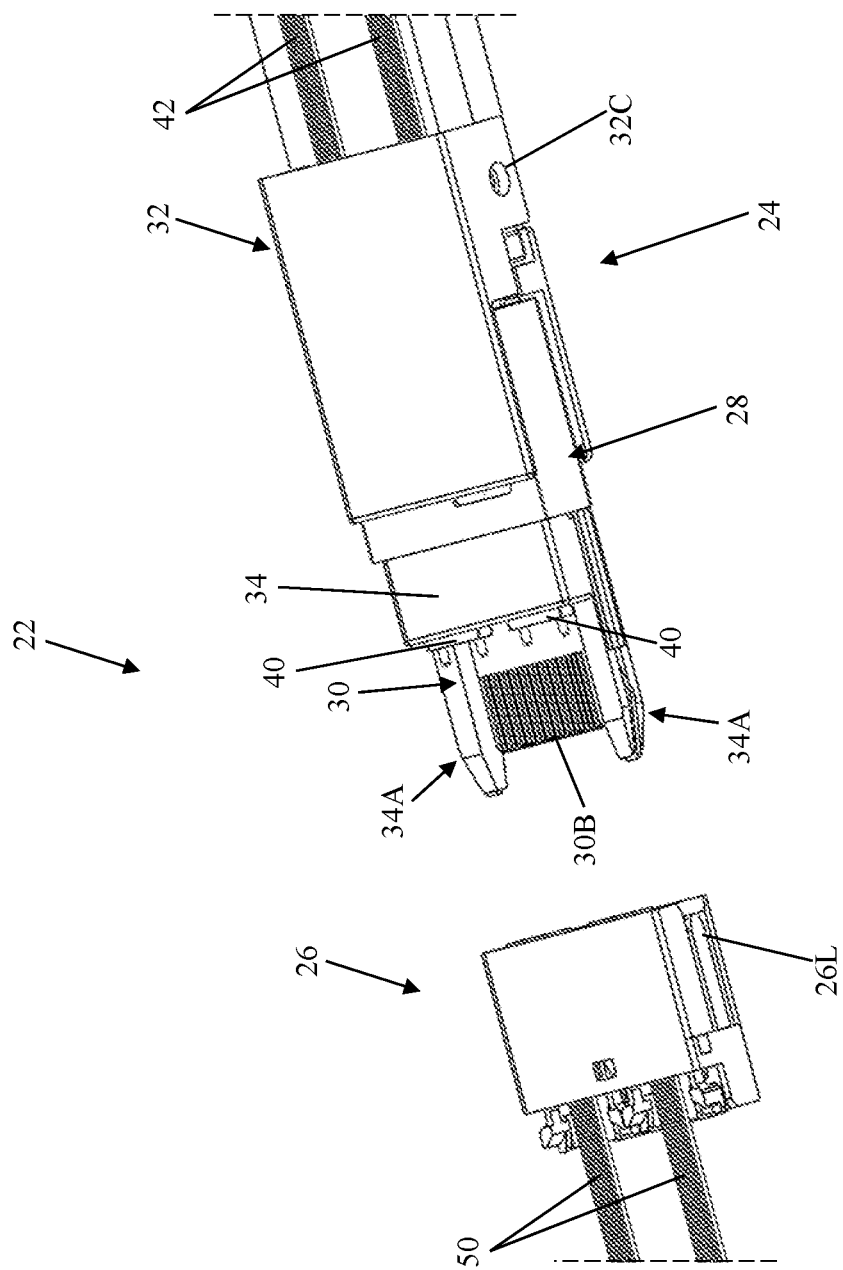
FIG. 2 is an exploded perspective of the pluggable external laser source connector.
Figure 3:
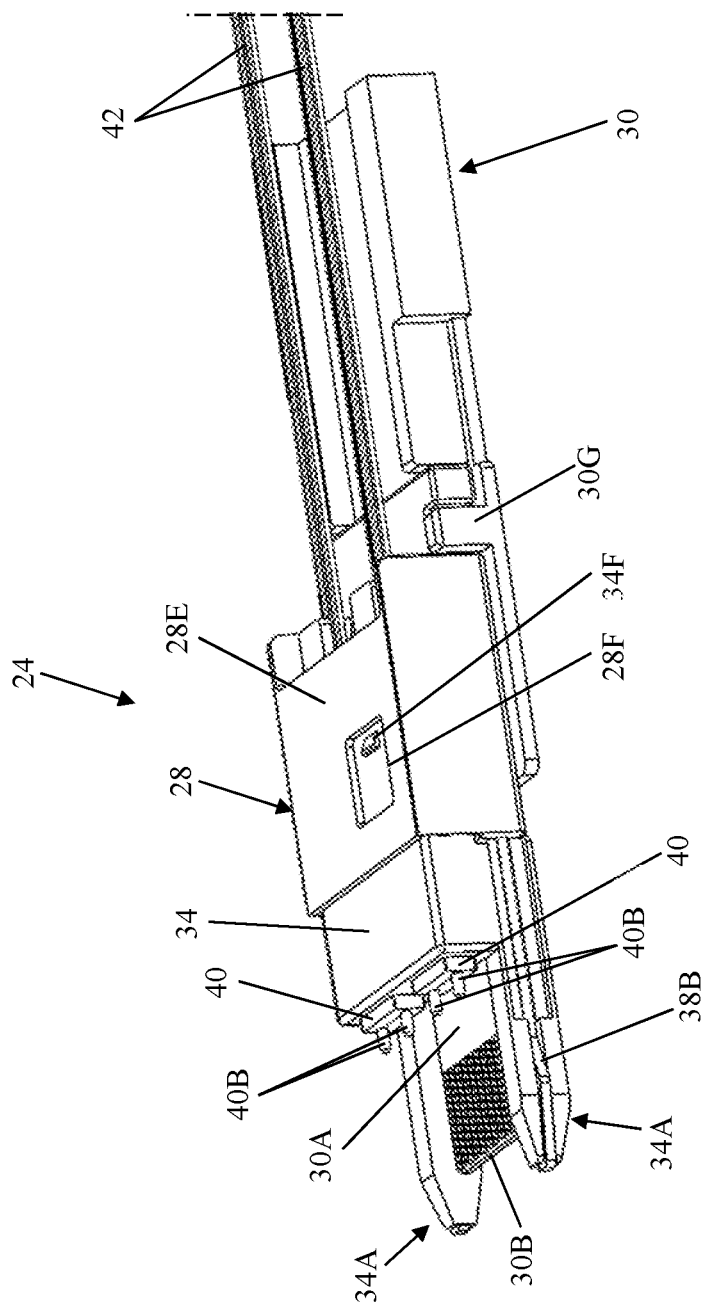
FIG. 3 is a perspective of a plug-in connector of the pluggable external laser source connector.
Figure 4:
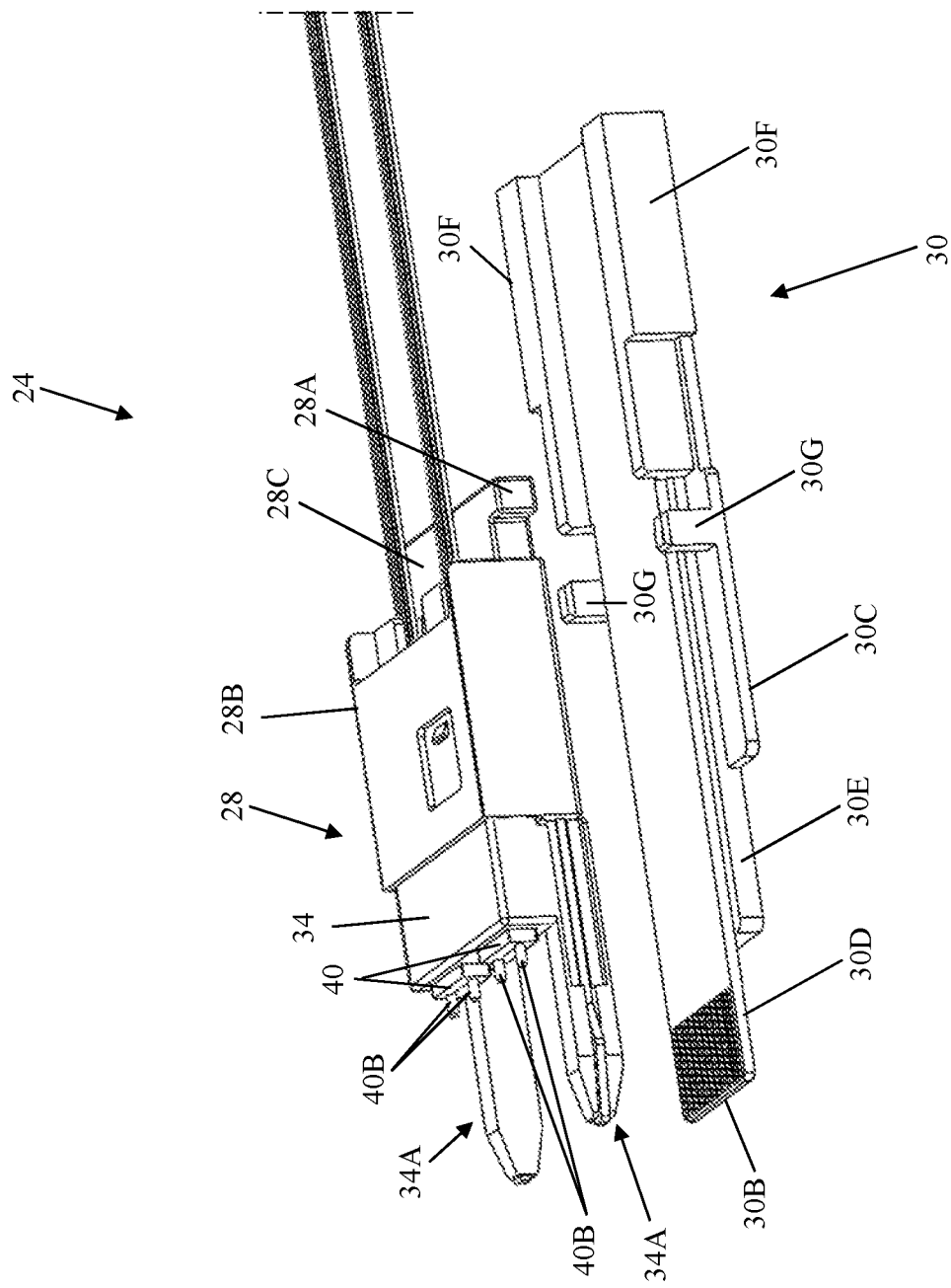
FIG. 4 is the perspective of FIG. 3 with an electrical connection portion exploded therefrom.

As may be seen in FIGS. 2-4, in one embodiment, an optoelectronic connection system 22 comprises a plug-in connector 24 that contains the external laser source 18. An adapter 26 is mounted on the printed circuit board 14 in the optical switch module 10 for connection and release of the plug-in connector 24 with the module. Referring to FIGS. 3 and 4, the plug-in connector 24 includes an upper, optical connection portion 28 and a lower, electrical connection portion 30. The electrical connection portion includes a daughterboard 30A having electrical contacts 30B at a front end for making electrical connection with the printed circuit board 14 in the optical switch housing 12. The daughterboard 30A is attached to an elongate support 30C such that a connection portion 30D of the daughterboard including the electrical contacts 30B projects out in a forward or connection direction from the elongate support. The connection portion 30D extends along a connection axis that generally runs lengthwise of the plug-in connector 24. The elongate support 30C includes a bottom wall 30E that extends the full length of the support and opposing side walls 30F projecting up from the bottom wall on opposite sides of the daughterboard 30A in a rearward region of the support. The elongate support 30C further includes a pair of tabs 30G located forward of front ends of the side walls 30F. Each tab 30G and adjacent front end of the side wall 30F are spaced apart to define a space sized and shaped to receive a corresponding tab 28A on the optical connection portion 28.

Figure 5:
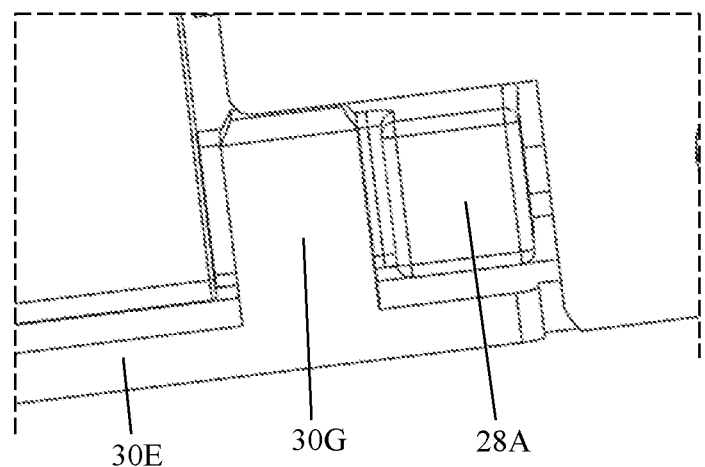
FIG. 5 is an enlarged fragment of the perspective of FIG. 3 showing interconnection of a support to a connection portion of the pluggable external laser source connector.
Figure 6:
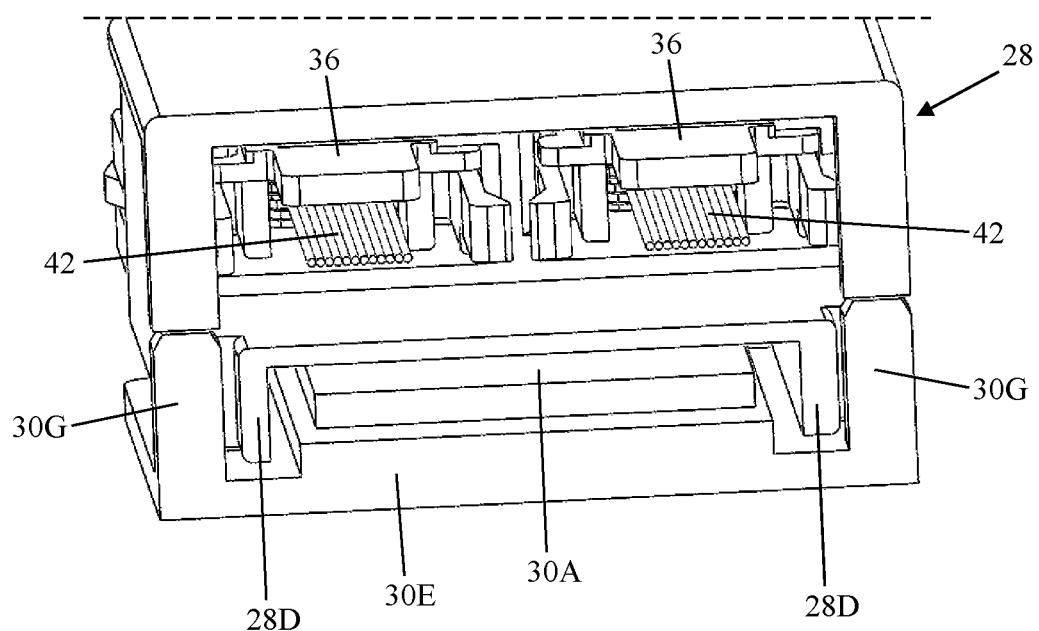
FIG. 6 is a fragmentary rear perspective of the pluggable external laser source connector.

The elongate support 30C is connected to the connection portion 30D of the plug-in connector 24 so as to permit the support and the daughterboard 30A carried by the support to float relative to the connection portion which facilitates connection to the adapter 26 as will be described. The upper, optical connection portion 28 includes a collar 28B having a floor 28C projecting rearward of the remainder of the collar. The floor 28C includes the laterally projecting tabs 28A on laterally opposite sides of the floor at its rear end. FIG. 5 shows an enlargement of a region of the plug-in connector 24 where one of the tabs 28A of the floor 28C of the collar 28B is received in the space between the tab 30G and side wall 30F of the elongate support 30C. There are gaps between the collar tab 28A and the support tab 30G, and between the collar tab and the side wall 30F of the elongate support 30C. This permits some relative movement between the elongate support 30C and the collar 28B in along the connection axis in forward and rearward directions. Similarly, there are also gaps between the collar tab 28A and the bottom wall 30E of the elongate support 30E, and between the collar tab and holding cover 32 (described more fully hereinafter). As shown in FIG. 6, the collar 28B further includes an inverted U-shaped piece having runners 28D that ride on the bottom wall 30E of the elongate support 30C along the connection axis. The runners 28D are thinner than the space between the daughterboard 30A and the elongate support tabs 30G. Thus, lateral motion between the optical connection portion 28 and the electrical connection portion 30 is permitted. The function of the float of the electrical connection portion 30 will be described more fully hereinafter.

Figure 7:
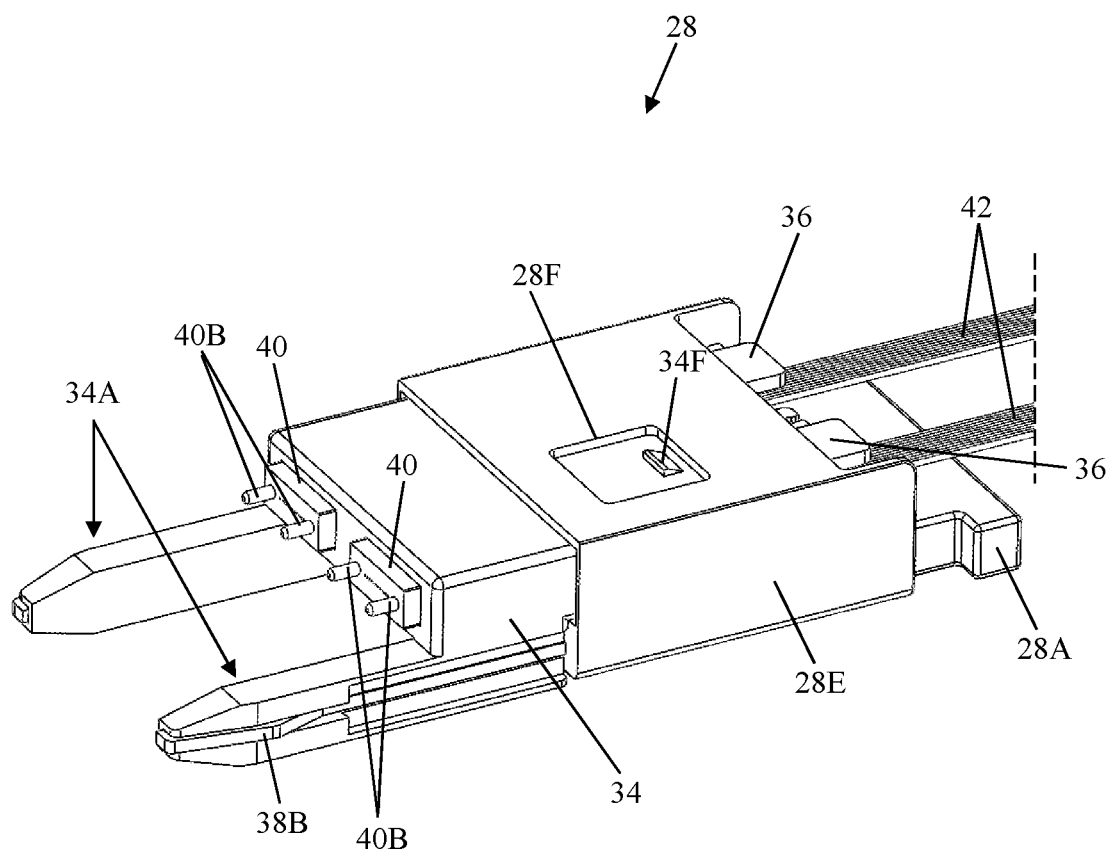
FIG. 7 is a perspective of the connection portion of the pluggable external laser source connector.
Figure 8:
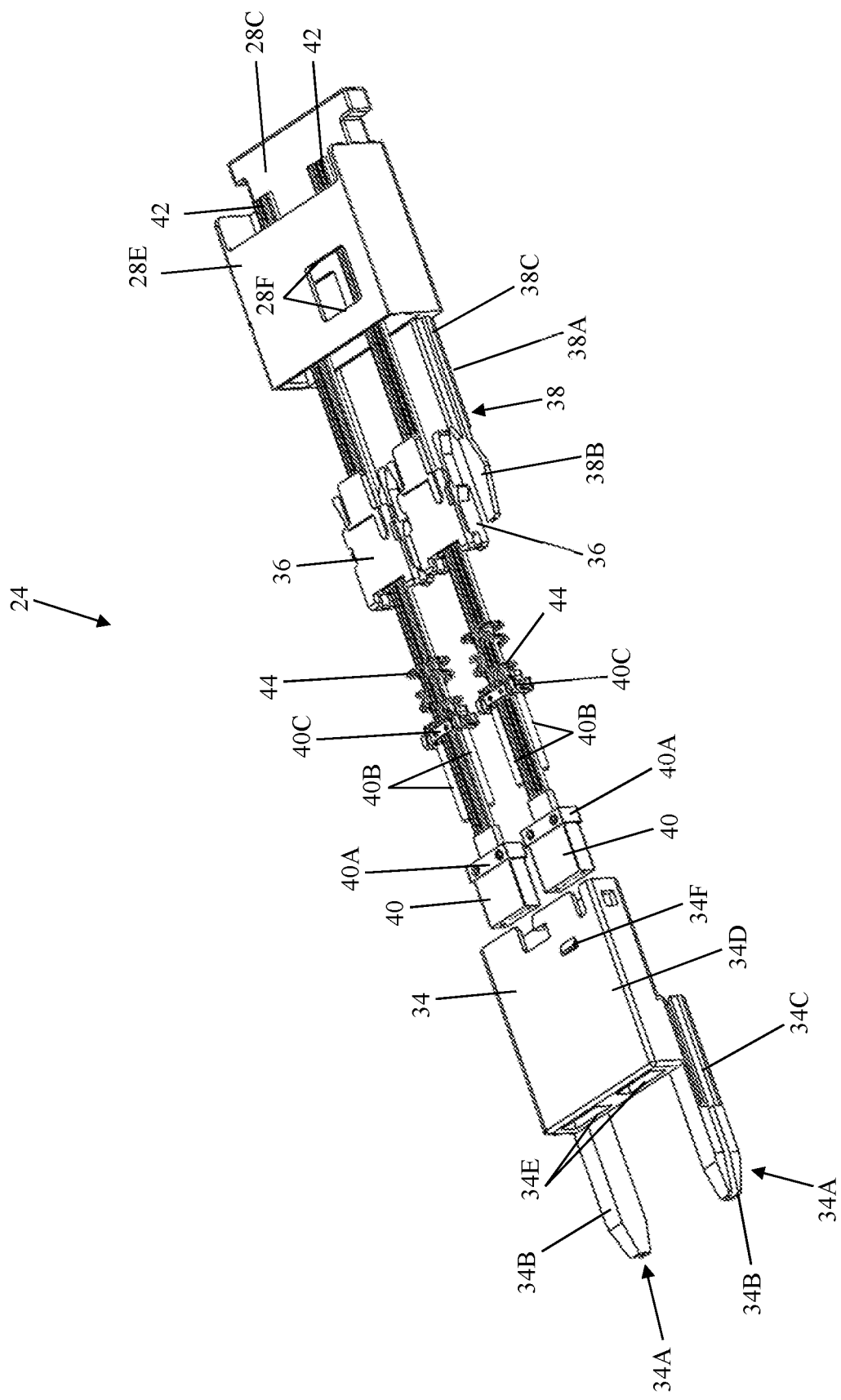
FIG. 8 is an exploded perspective of the pluggable external laser source connector.

Referring now to FIGS. 7 and 8, the plug-in connector 24 comprises a front housing 34, back housings (or "backposts") 36 and a release mechanism 38. The front housing includes a pair of guide arms 34A that are shaped and arranged for guiding the plug-in connector 24 into the adapter 26, and also for use in making a releasable connection with the adapter. Each of the guide arms 34A tapers near its distal to a narrow tip 34B. Each guide arm 34A includes a release member channel 34C in a laterally outward facing side of the arm. The channels 34C each extend parallel to the connection axis. The front housing 34 further includes a ferrule holder 34D defining internal passages 34E that receive two mechanical transfer (MT) ferrules 40 in side-by-side relation. Although mechanical transfer ferrules 40 are disclosed and described in this description, it will be understood that other types of ferrules could be used within the scope of the present invention. In the illustrated embodiment, the ferrules 40 are arranged horizontally, in a side-by-side relation. In particular, the ferrules 40 are generally coplanar with one another. The internal passages 34E open at the front of the ferrule holder 34D to permit forward portions of the MT ferrules to project out the front of the ferrule holder. The ferrules 40 each include flanges 40A, and the open forward ends of the passages 34E in the ferrule holders are each smaller than the flanges so that the ferrules cannot pass completely out of the internal passages through the front of the ferrule holder 34D. The ferrules 40 each terminate a plurality of optical fibers brought to the ferrule be respective ribbon cables 42. In the illustrated embodiment, the ferrules 40 are each a male ferrule having a pair of mechanical transfer pins 40B held by a pin holder 40C. The pins 40B are received through the ferrules 40 and project forward from the ferrules as can be seen in FIG. 7. In the illustrated embodiment, the pins 40B of the ferrules 40 are generally coplanar with each other. Likewise, the optical fiber terminations in both ferrules 40 are generally coplanar with one another. Flattened coil springs 44 positioned around respective ones of the ribbon cables 42 engage the pin holders 40C to bias the MT ferrules forward in the connection direction. The back housings 36 are constructed for being received in a rear end of the ferrule holder 34D and connected to the ferrule holder 34D. A rear end of each spring 44 engages a front end of a respective ones of the back housings 36 for providing the compressive force to urge the ferrules 40 forward. It will be understood that there could be only one back housing or more than two back housings (not shown) within the scope of the present invention.

The release mechanism 38 comprises the collar 28B and release members 38A on laterally opposite sides of the collar that project forward from the collar. The collar 28B includes the floor 28C and a surround 28E that together with the floor forms a square receptacle that slidingly receives a rear portion of the ferrule holder 34D including substantial portions of the back housings 36. The ferrule holder 34D has wedge-shaped stops 34F on top and bottom surfaces. The collar 28B has rectangular openings 28F it its top and bottom surfaces that generally align with respective ones of the wedge-shaped stops 34F on the ferrule holder 34. As the collar 28B is pushed onto the ferrule holder 34D, the wedge-shaped stops 34F engage a top wall and the bottom wall (respectively) of the collar 28B and deform them outward from the connection axis. When the stops 34F come into registration with the rectangular openings 28F, the top and bottom walls of the collar 28B snap back to their original configuration. Thereafter, any attempt to move the collar rearwardly off of the ferrule holder is arrested by engagement of the top and bottom walls at edges of the rectangular openings 28F with substantially vertical surfaces of the stops 34F. However, a substantial range of motion of the collar relative to the ferrule holder is permitted.

The release members 38A each include a ramp portion 38B at a distal end of the release member, and a slide 38C connecting the ramp portion to the collar 28B. The slides 38C each have a generally T-shaped cross section. As the collar 28B is pushed onto the ferrule holder 34D during assembly of the plug-in connector 24, the ramp portions 38B of the release members enter the channels 34C on the guide arms 34A. The ramp portion 38B protrudes laterally from the channel 34C of each of the guide arms 34A. As the slides 38C enter the channels 34C, wider portions of the slides enter undercut portions of the guide arm 34A. In this way the release members 38A are held by the guide arms 34A against lateral movement relative to the guide arms. It will be appreciated that movement of the collar 28B will result in movement of the ramp portion 38B along the channel 34C of the guide arm. As will be described more fully hereinafter, this movement results in release of the plug-in connector 24 from the adapter 26.

Figure 9:
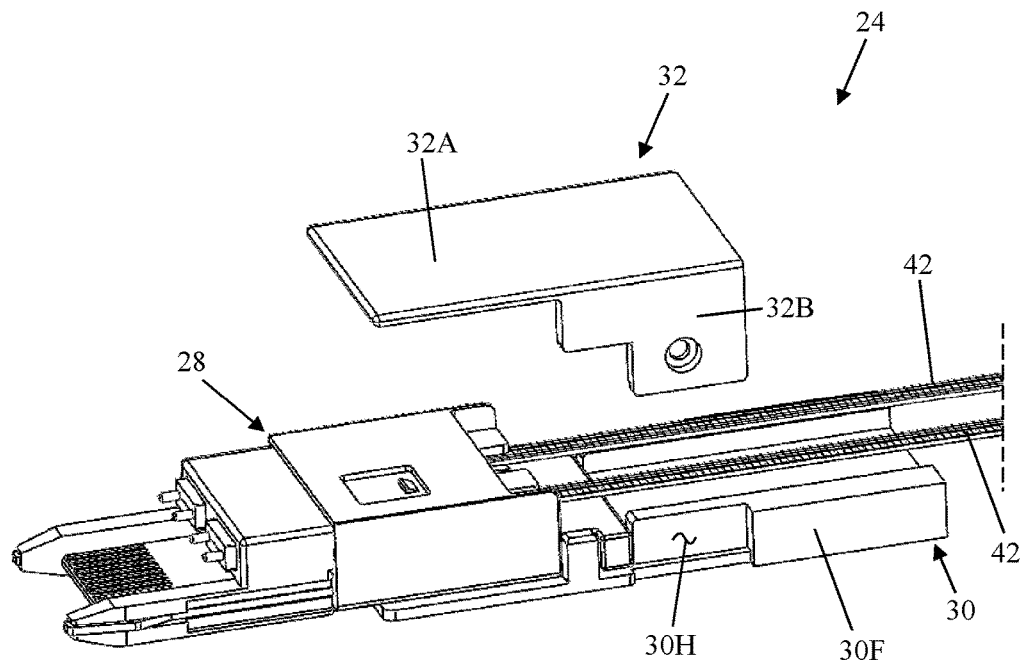
FIG. 9 is a perspective of the plug-in connector with a holding cover exploded therefrom.
Figure 10:
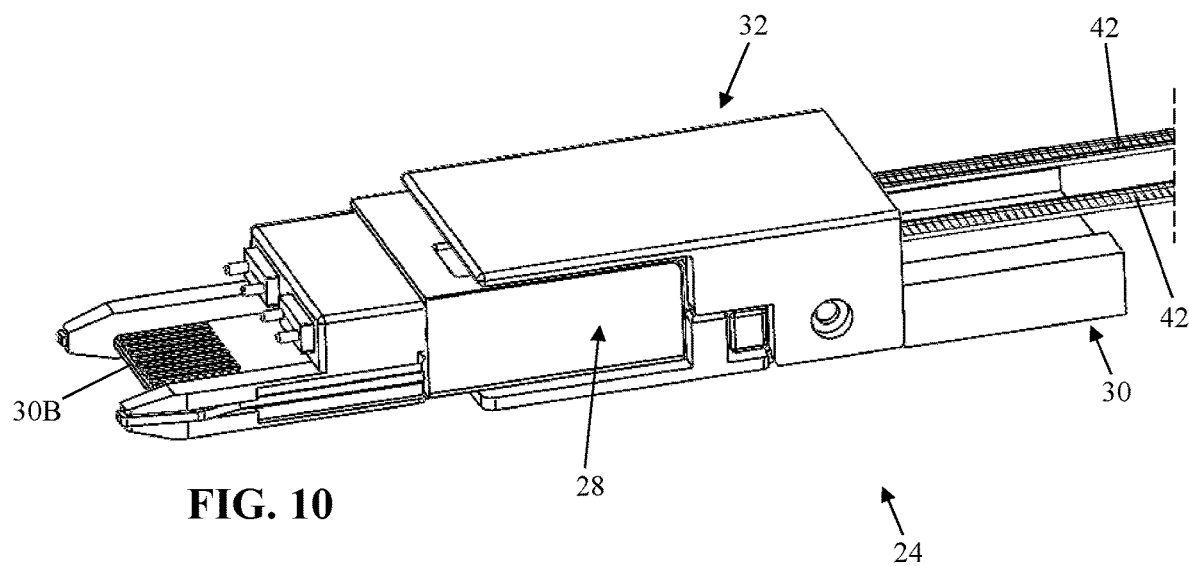
FIG. 10 is a perspective of the plug-in connector connected to the holding cover.

Once the plug-in connector 24 is assembled, the holding cover 32 can be applied to hold the pre-assembled plug-in connector components in position (see, FIGS. 9 and 10). The holding cover 32 includes a flat top member 32A and legs 32B depending from opposite edges of the flat top member. The legs 32B are each shaped so that a lower portion fits into a space 30H in the side wall 30F of the elongate support 30C. Each leg has an opening 32C for receiving a mounting screw (not shown) to secure the holding cover to the plug-in connector 24. The mounting screw connects the cover 32 to the lower portion 30 of the plug-in connector 24. The cover 32 and lower portion 30 capture the tab 28A of the upper portion 28 so that the upper portion cannot separate from the lower portion. However, the connection is such that some degree of relative movement between the upper portion 28 and the lower portion 30 is permitted to assist in alignment of the optical portions somewhat separately from the alignment of the electrical portions, as described below. It will be understood that the upper portion 28 and lower portion 30 may be connected to each other in other ways within the scope of the present invention.

Figure 11:
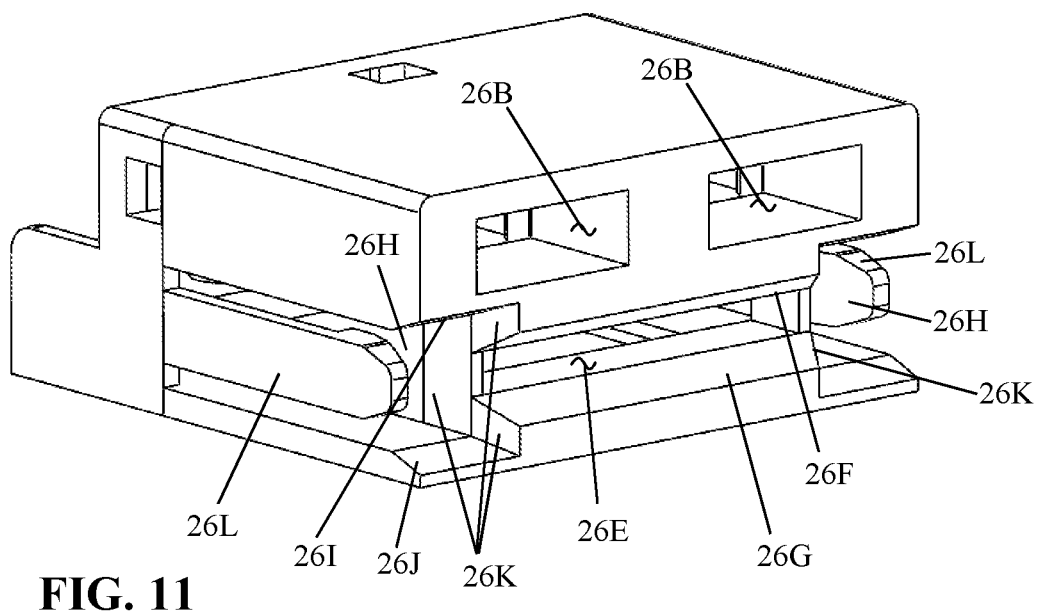
FIG. 11 is a front end perspective of an adapter housing.
Figure 12:
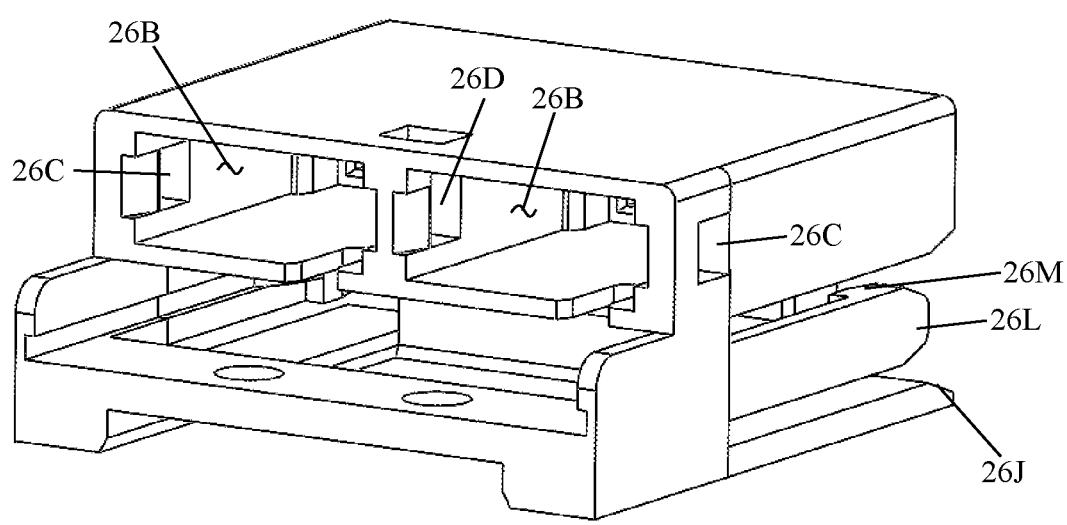
FIG. 12 is a rear end perspective of the adapter housing.
Figure 13:
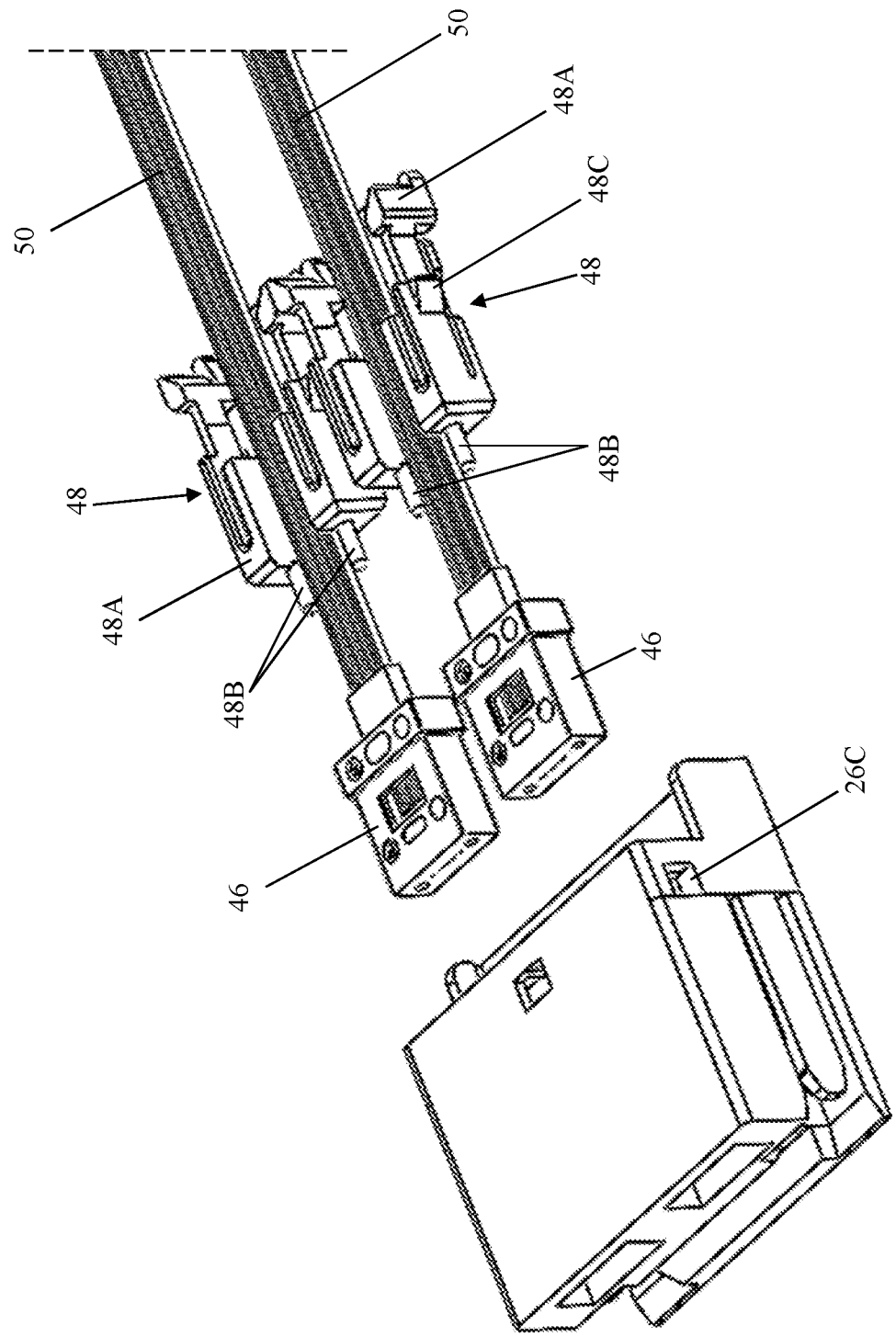
FIG. 13 is an exploded perspective of the adapter.
Figure 14:
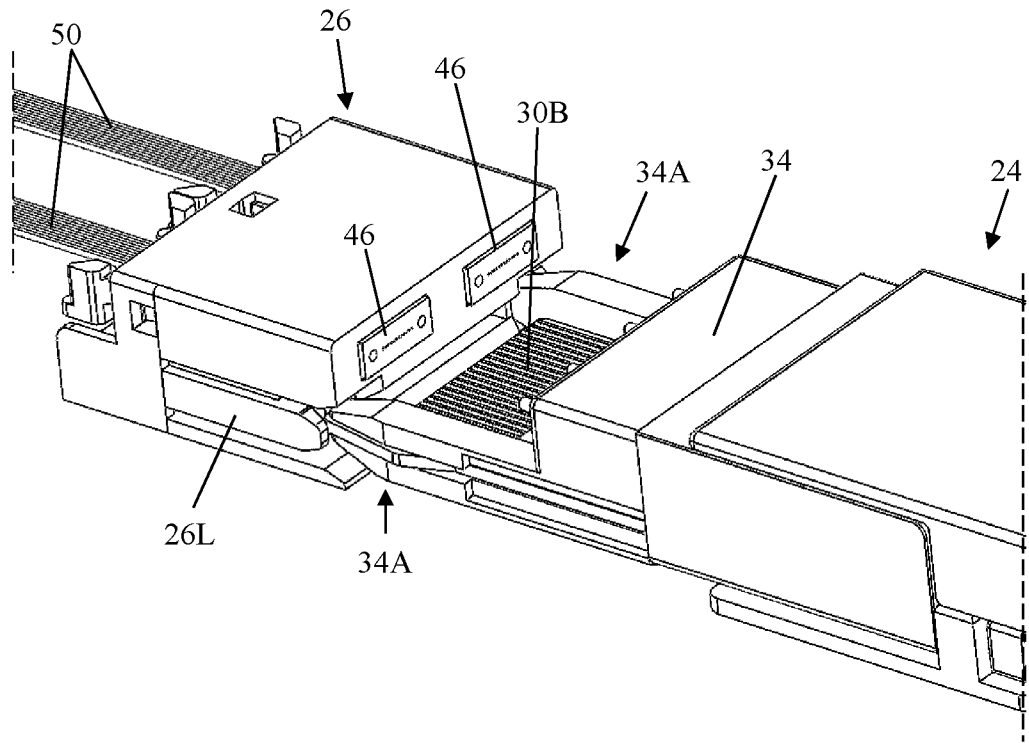
FIG. 14 is a perspective showing initial contact of the plug-in connector with the adapter 26 upon mating of the plug-in connector with the adapter.

As shown in FIG. 13, the adapter 26 includes an adapter housing 26A, (female) MT ferrules 46 and a back housing 48 for each of the ferrules. The adapter housing 26A defines a pair of ferrule receptacles 26B that have larger openings on the rear side (FIG. 12) and smaller openings on the front side (FIG. 11). The ferrule receptacles each receive one of the adapter ferrules 46. The adapter ferrules terminate optical fibers connected to the adapter 26 for making an optical connection at the front ends of the ferrules 46. The optical fibers are brought to each adapter ferrule 46 by a respective ribbon cable 50. The ferrules 46 are hold in the adapter housing 26A by the back housings 48. The back housings each include a body 48A and locator pins 48B projecting forward of the body. The locator pins 48B extend into through passages in the ferrules 46, but only a short distance into the ferrules to achieve registration between the back housings 48 and the respective ferrules. The back housings 48 include catches 48C on each side. Only one catch 48C can be seen in the drawings. When each back housing 48 is inserted into the adapter housing 26A, the catches 48C snap into an outer hole 26C and an inner hole 26D formed in the adapter housing (see, FIG. 12). The inside catch 48C on each back housing 48 is received on a different side of the same inner hole 26D of the adapter housing 28A. The ferrules 46 are held in place by the back housings 48 so that forward portions of the ferrules project slightly out from the adapter housing through the front openings of the ferrule receptacles 26B. As shown the adapter 26 is mounted on the printed circuit board 14, but could be mounted on another electrical or optical component (not shown) that is mounted on the printed circuit board.

The adapter housing 26A further defines a lower receptacle 26E configured to hold an edge card receiver (not shown) capable of making electrical connection with the daughterboard 30A of the plug-in connector 24. As shown in FIG. 11, the lower receptacle 26E has a front opening for receiving the connection portion 30D of the daughterboard 30A. The adapter housing 26A is formed with an angled upper surface 26F and an angled lower surface 26G at the leading end of the front opening of the lower receptacle 26E. The angled upper and lower surfaces 26F, 26G angle toward each other as they move into the adapter housing 26A so that the front opening of the lower receptacle 26E is widest at its entrance, and then funnels toward the lower receptacle.

The adapter housing 26A further includes side slots 26H arranged to receive respective ones of the guide arms 34A of the plug-in connector 24. The front ends of the side slots 26H include an angled upper surface 26I and an angled lower surface 26J. The angled upper and lower surfaces 26I, 26J angle toward each other as the surfaces move in the connection direction to guide the guide arms 34A into the side slots 26H. The side slots also each include angled interior surfaces that direct the guide arms 34A laterally outward into the side slots 26H. A latch arm 26L is provided in each side slot 26H. Each latch arm 26K is mounted at one end on the adapter housing 26A and projects toward the front end of the side slot 26H. The latch arms 26K can each flex laterally outward from the slot 26H for use in connecting and disconnecting the plug-in connector 24. Further each latch arm 26K includes a hook portion 26M adjacent to its distal end, used in making a latching connection with the plug-in connector 24.

Figure 15:
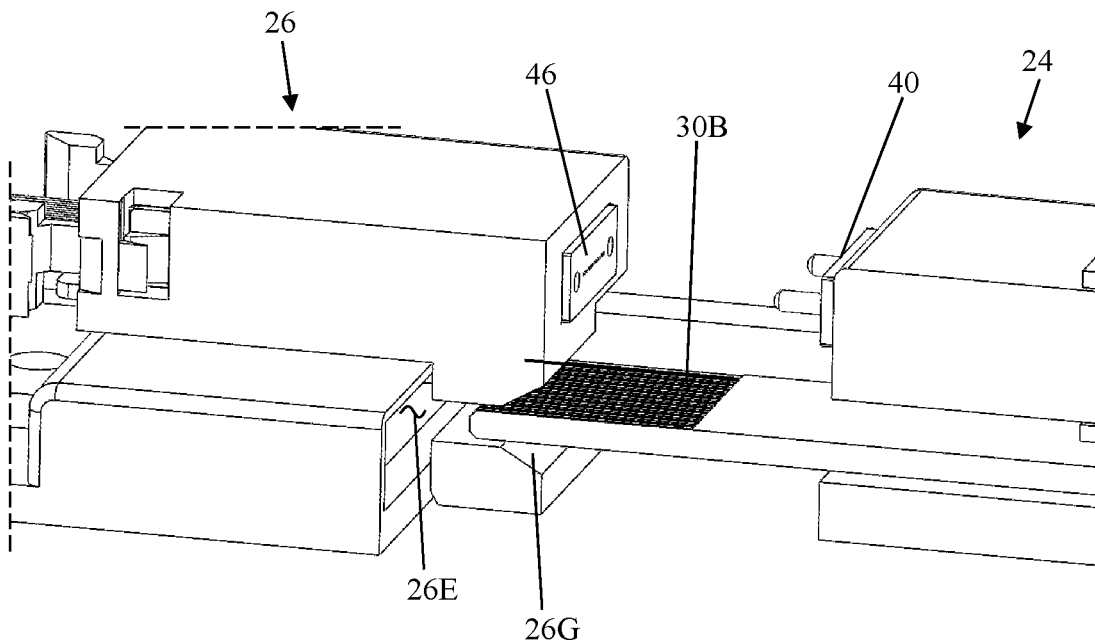
FIG. 15 is a perspective from more of a side vantage with parts removed showing a further progression of the mating and in particular the reception of the daughterboard into the adapter housing.

Referring now to FIGS. 14-18, mating of the plug-in connector 24 with the adapter 26 will be described. As may be seen in FIG. 14, as the plug-in connector 24 moves further toward the adapter 26 from the position shown in FIG. 2, the tapered tips 34B of the guide arms 34A first engage the adapter housing 26A. More specifically, the tapered tips 34B may engage any or multiple of the upper angled surface 26I, the lower angled surface 26J and the interior surfaces 26K leading into the side slots 26H. At the moment depicted in FIG. 14, the connection portion 30D of the daughterboard 30A has not engaged the adapter housing 26A. The alignment achieved by the guide arms 34A being received in the side slots 26H allows the pins 40B of the ferrules 40 of the plug-in connector 24 to align with the openings in the (female) ferrules of the adapter 26. FIG. 15 schematically illustrates the reception of the leading edge of the connection portion 30D of the daughterboard 30A into the front opening of the lower receptacle 26E. It is possible just prior to the position shown in FIG. 15, that the leading edge of the connection portion 30D of the daughterboard 30A may not be perfectly aligned with the front opening of the lower receptacle 26E in the adapter housing 26A. However, the engagement of the leading edge with one of the upper and lower angled surfaces 26F, 26G at the front entrance of the lower receptacle 26E guides the daughterboard 30A into the lower receptacle. The construction and connection of the plug-in connector 24 with the elongate support 30C operates to allow relative movement between the front housing 34 and guide arms 34A, and the daughterboard 30A and elongate support 30C. In this way the guide arms 34A and daughterboard 30A may achieve alignment independently of each other within a range. Further movement of the connection portion 30D of the daughterboard 30A into the lower receptacle 26E produces electrical connection between the plug-in connector 24 and the adapter 26.

Figure 16:
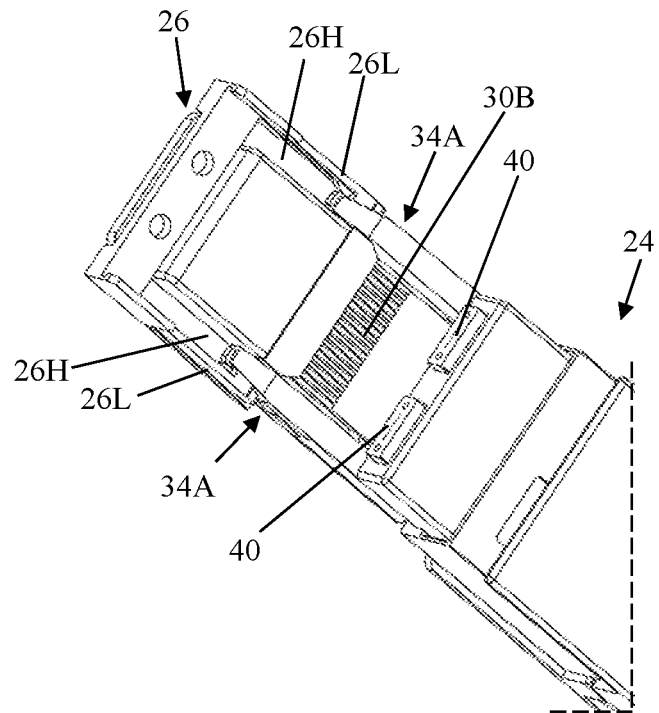
FIGS. 16-18 schematically illustrate the interaction of guide arms of the plug-in connector with latch arms of the adapter to produce a positive connection of the plug-in connector with the adapter.
Figure 17:
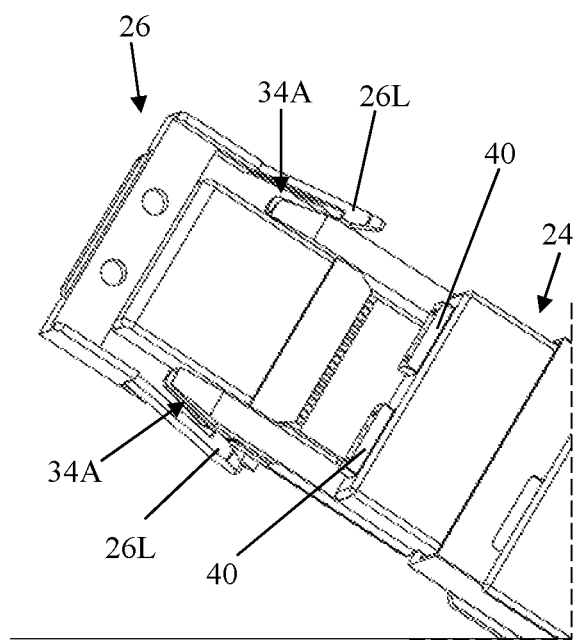
Figure 18:
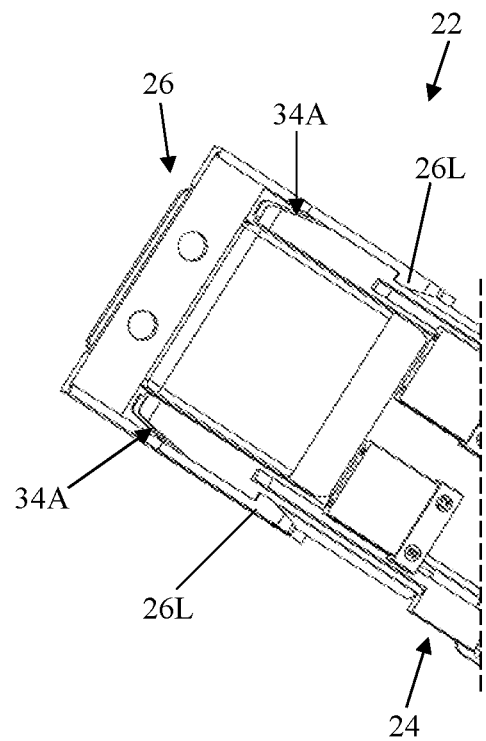

FIGS. 16-18 also illustrate mating of the plug-in connector 24 with the adapter 26, but are particularly drawn to show how latching of the plug-in connector with the adapter occurs. In FIG. 16, the guide arms 34A have moved into the side slots 26H and the angled laterally outwardly facing surfaces of the guide arms engage an angled interior surface of the latch arms 26L. The laterally outward facing surfaces of the guide arms 34A at the narrow tips 34B angle inward toward the connection axis. This feature helps to achieve lateral alignment of the guide arms 34A with the side slots 26H that in turn produces lateral alignment of the ferrule pins 40B of the ferrules 40 with the openings in the ferrules 46. The inwardly angled portion of the laterally outward facing surface of each guide arm 34A first engages the latch arm. The shape of the narrow tip 34B and the shape of the hook portion 26M of the latch arm 26L helps to wedge the latch arms out to the positions shown in FIG. 17 after the guide arms 34A have been advanced farther into the side slots 26H. Further advancement of the guide arms 34A caused the hook portions 26M of the latch arms 26L to move past the narrow tips 34B. The hook portion 26M reaches the release member channel 34C of the guide arm 34A and snaps into the release member channel, as show in FIG. 18. At this point movement of the plug-in connector 24 out of the adapter 26 in a direction opposite the connection direction is resisted by the engagement of the hook portions 26M of the latch arms 26L with the guide arms 34A.

Figure 19:
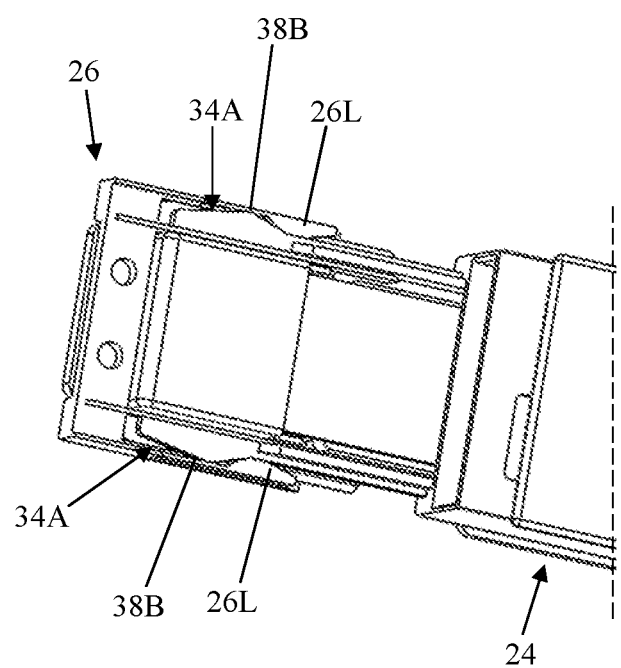
FIGS. 19 and 20 schematically illustrate operation of a release mechanism of the plug-in connector that permits disconnection of the plug-in connector from the adapter.
Figure 20:
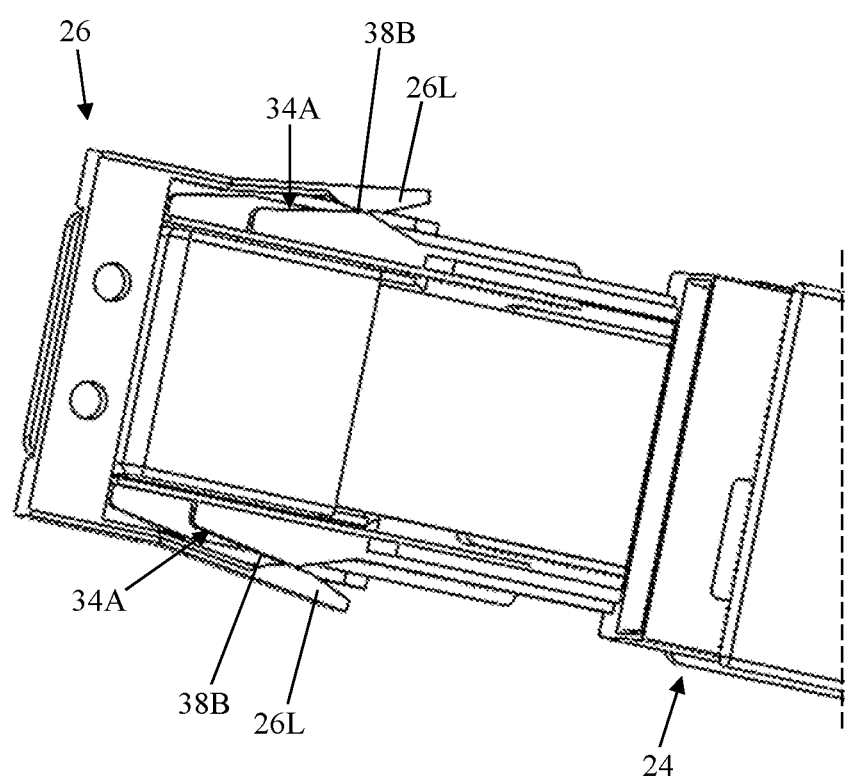

The latched connection of the plug-in connector 24 with the adapter 26 can be released to allow the plug-in connector to be removed from the adapter. FIG. 19 shows that when the hook portions 26M of the latch arms 26L are received in the release member channels 34C, the ramp portions 38B of the release members 38A are immediately adjacent the hook portions 26M of the latch arms 26L. Pulling on the collar 28B in a direction opposite the connection direction on the collar causes the collar and release members 38A to move in a direction opposite the connection direction. Initially, the guide arms 34A and front housing 34 are held in place by the engagement of the hook portions 26M of the3 latch arms 26L with the guide arms 34B. However, as the release mechanism 38 withdraws as shown in FIG. 20, the ramp portions 38B of the release members 38A engage the hook portions 26M and deflect the latch arms 26L laterally outwardly. In this deflected position, the hook portions 26M of the latch arms 26L are withdrawn from engagement with the guide arms 34A. At this point, the guide arms 34A and front housing 34 are withdrawn from connection with the adapter 26. In essence, the plug-in connector 24 and adapter 26 upon disconnection again assume the relative positions shown in FIG. 2. The ramp portion 38B of the release member 38A includes front and rear ramp surfaces 38D, 38E. The rear ramp surface 38E engages the hook portion 26M of the latch arm 26L to move the latch arm outward to release the connection of the plug-in connector 24 with the adapter 26. The front ramp surface 38D continues to engage the hook portion 26M of the latch arm 26L after the release to gently allow the latch arm to move back to its original position as the guide arms 34A and release members 38A continue to withdraw from the adapter 26.

Figure 21:
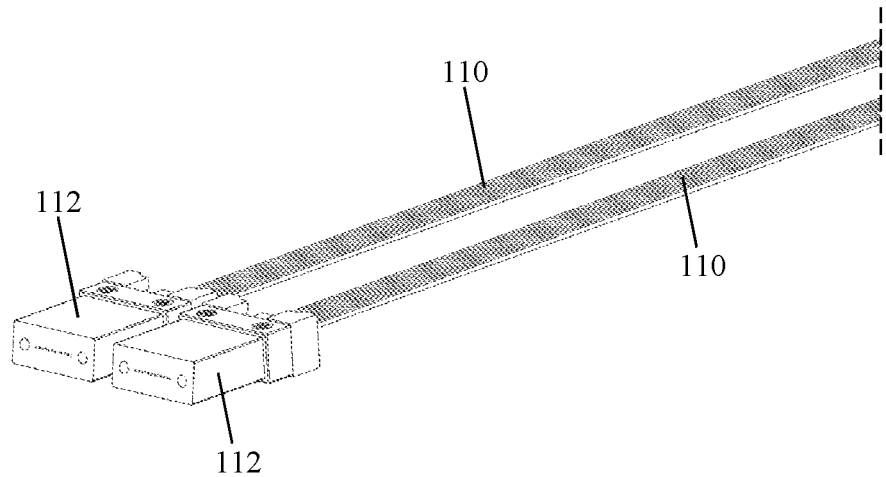
FIG. 21 is a perspective of two MT ferrules terminating respective optical fiber cables.
Figure 22:
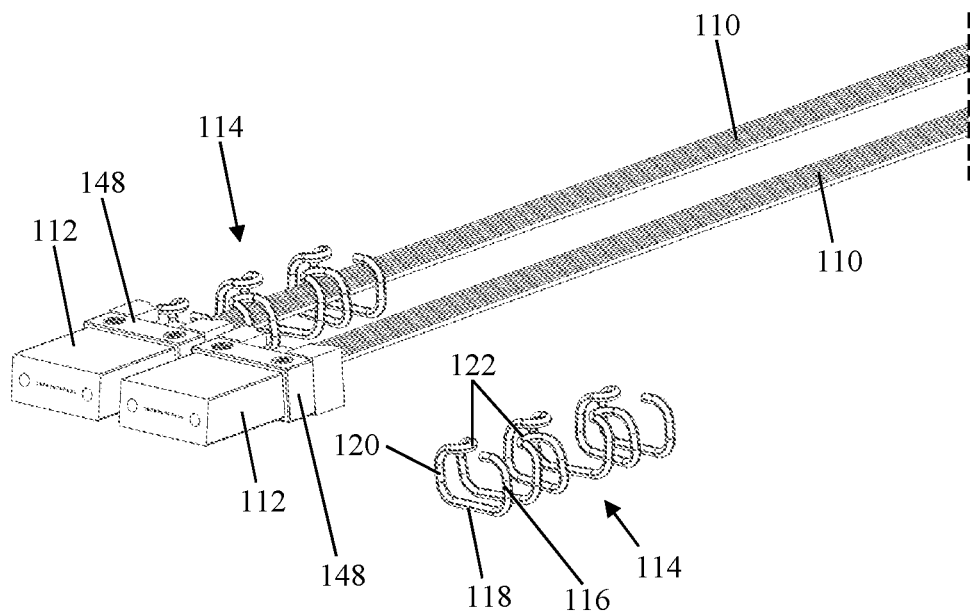
FIG. 22 is the perspective of FIG. 21 showing one spring applied to one of the optical fiber cables and other spring next to the other cable prior to mounting on the other of the optical fiber cables.
Figure 23:
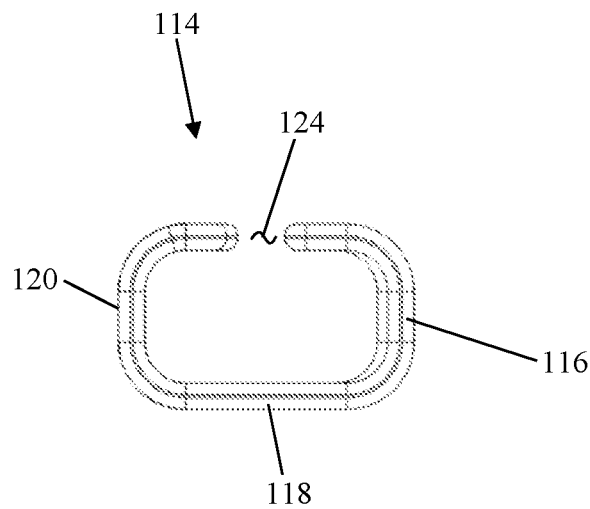
FIG. 23 is an enlarged end view of one of the springs.
Figure 24:
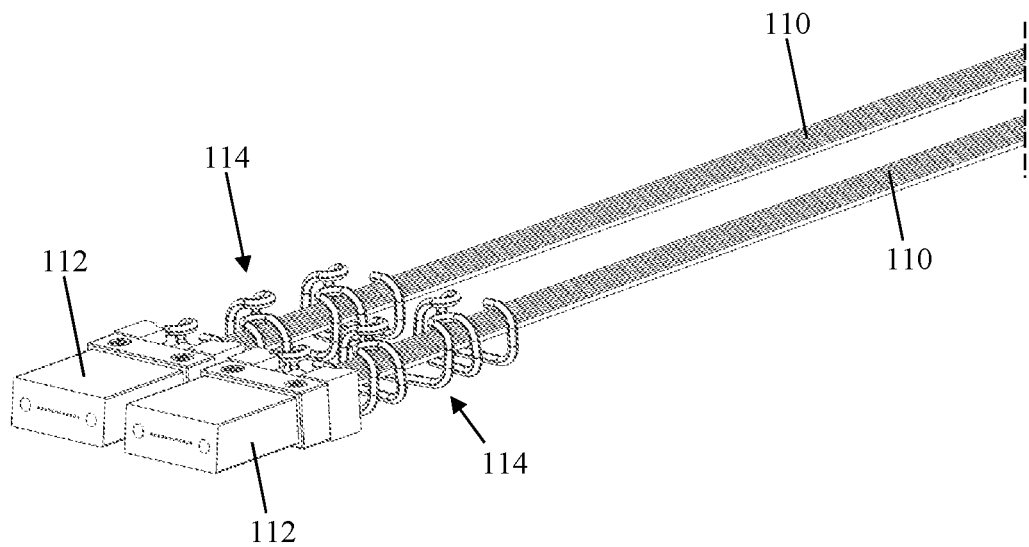
FIG. 24 is a perspective of the two MT ferrule having the springs mounted thereon.

Referring now to FIGS. 21-28, in some instances, it is desirable to be able to incorporate MT ferrules into a connector which permits biased rearward movement. As used in this portion of the description, rearward movement means movement that withdraws the ferrules into the connector. Movement of the ferrules with respect to the connector permits a good optical connection to be obtained by maintaining contact of the ferrules with opposing MT ferrules (not shown) of another connector without require exact precision in the location of the mating ferrules. In order to achieve a forward biased range of motion, springs are provided to operatively engage the ferrules at their flange ends. However in situations where an optical fiber cable 110 has been terminated by ferrules 112 as shown in FIG. 21, a coil spring cannot be slid over the ferrule onto the cable. Accordingly, a spring 114 of the present embodiment used with each of the two ferrules 112 is formed to have one side which is completely open along the full length of the spring for sliding the spring onto the cable 110 behind the ferrule terminating the optical fibers of that cable (see, FIGS. 22 and 23). Beginning at a first free end of the spring wire making up the spring 114, the spring wire is formed into a semi-oval segment. In the illustrated embodiment, the semi-oval segment includes a first curved ("C-shaped") section 116, a linear section 118 and a second curved ("C-shaped") section 120. However, the spring wire does not cross over the first free end to begin a second turn of the spring (as would be the case with a coil spring). Instead, the spring wire is bent back along a U-shaped switchback segment 122. From the U-shaped segment, the spring wire is again formed into a generally semi-oval segment that is aligned with the first oval segment and includes the same spring wire sections. Again, prior to the spring wire fully enclosing the oval segment, it is bent back again in another U-shaped segment. This configuration is repeated until reaching the second free end of the spring wire. In the illustrated embodiment, the first and second ends of the spring wire are on the same side of the spring 114. The construction of the spring 114 results in an opening 124 being left in the top side of the spring (as shown in FIG. 23) extending the full length of the sprint. The opening 123 provides a passage for the cable into the interior of the spring so that the spring can be mounted on the cable in a lateral direction. This allows the spring 114 to be mounted on the cable after the ferrule 112 is attached to the cable, instead of before. Typically, conventional springs have to mounted on the cable before the ferrule is attached to the cable because the conventional springs cannot be threaded over the ferrule. FIG. 24 shows both ferrules and cables with the springs mounted on them.

Figure 25:
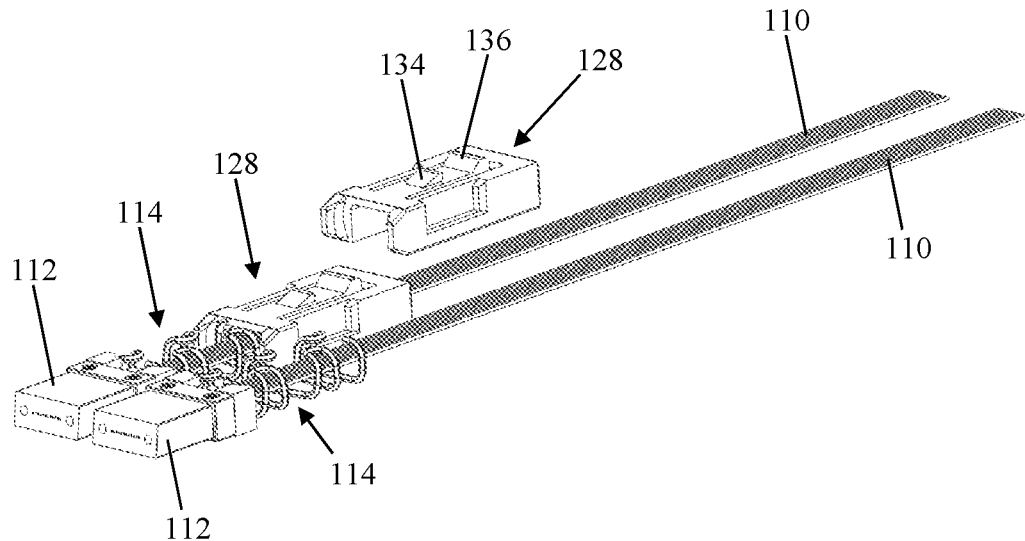
FIG. 25 is the perspective of FIG. 24, but further illustrating the addition of backposts.
Figure 26:
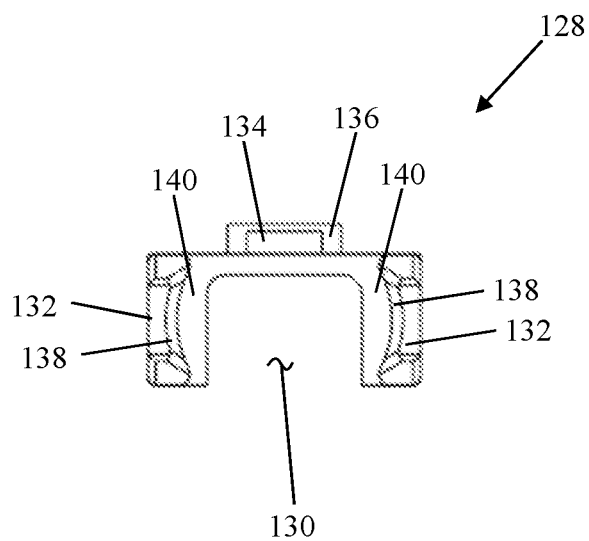
FIG. 26 is a front end view of one of the backposts.

In order for the springs 114 to operate properly in the assembled connector 126 (FIG. 28), some structure is required to compress the springs. As with the springs 114, this structure cannot be slid axially over the cable or ferrule from one end. Accordingly, backposts 128 have a generally inverted channel shape, as shown in FIGS. 25 and 26. Each backpost 128 has a generally inverted U-shape in cross section, so that the bottom of each backpost defines an opening 130 along its full length. Thus, each backpost 128 can be placed on the cable 110 from a position above the cable (as oriented in FIG. 25) down onto the cable behind the springs 114. The cable 110 passes laterally through the opening 130 into the backpost 128. This allows the backpost 128 to be mounted on the cable after the ferrule 112 is attached to the cable, instead of before. Typically, conventional backposts have to mounted on the cable before the ferrule is attached to the cable because the conventional backposts cannot be threaded over the ferrule. Each backpost includes forward projecting, opposing pair of retaining fingers 132, a catch 134 on a top wall of the backpost 128 and a stop 136 spaced rearward of the catch. As may be seen in FIG. 26, the retaining fingers 132 having curved interior opposing faces 138 and a reaction surface 140 facing forwardly at the base of each retaining finger. The curvature of the opposing faces 138 of the retaining fingers 132 generally conforms with the curvature of the sides of the spring 114. An end of one of the springs 114 fits between the retaining fingers 132 and rests against the reaction surface 140 of the backpost 128. The retaining fingers 132 hold the spring 114 against lateral movement relative to the backpost 128. It will be understood that as applied to the cable 110 as shown in FIG. 25, the backpost 128 is not attached to the cable, the spring 114 or the ferrule 112. Fixation occurs upon assembly with the connector 126 as will be described.

Figure 27:
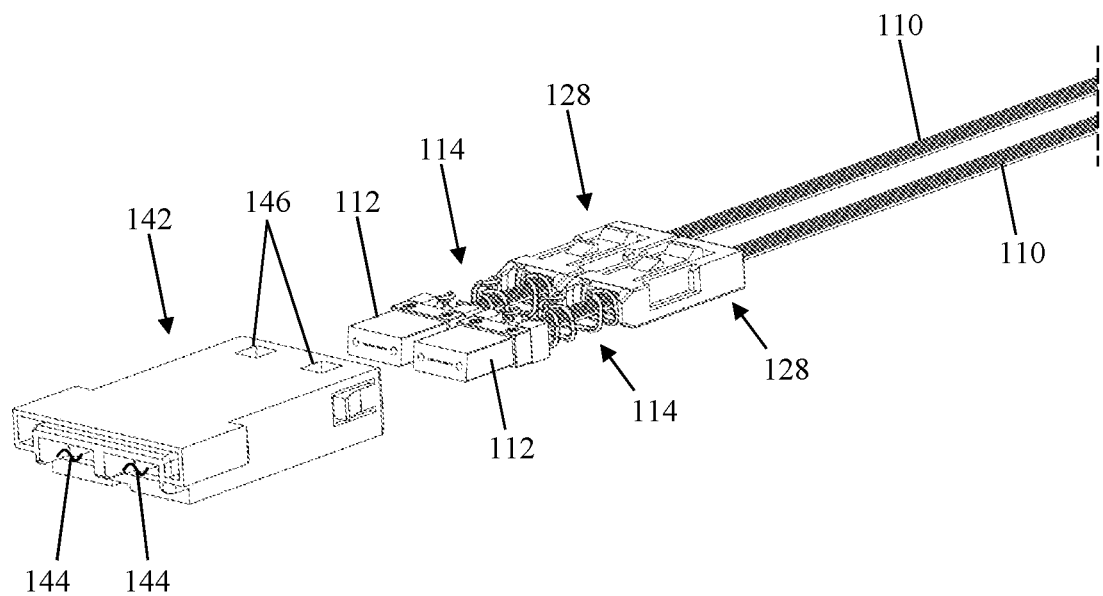
FIG. 27 is a perspective of the two MT ferrule assembled with the springs and backposts thereon just prior to assembly with a front housing.
Figure 28:
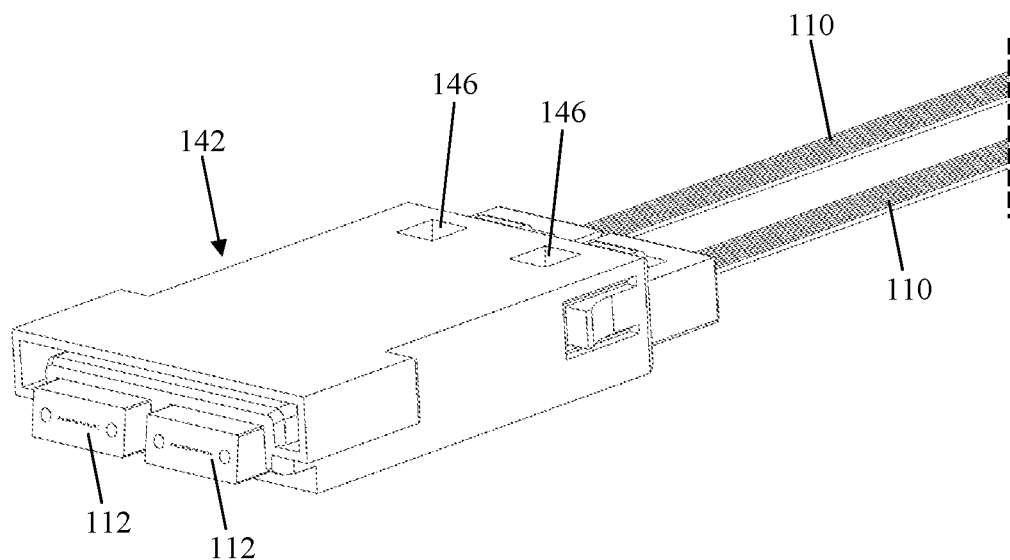
FIG. 28 is a perspective of the assembled connector.

As shown in FIG. 27, the pre-assembled parts of the MT ferrules 112, springs 114 and backposts 128 are moved toward an open rear end of a front housing 142. The MT ferrules 112 move into the front housing 142 and protrude through forward openings 144 in the front housing. The backposts 128 eventually enter the open rear end of the front housing 142. The catches 134 each engage a top wall of the front housing 142 at the open rear end. The catches 134 have a rearward slope and act as inclined planes to deflect the top wall upward so that the catches pass into the front housing 142. It is also possible that the engagement of the catches 134 with the top wall of the front housing 142 causes the catches and top walls of the backposts 128 to deflect down. It is also possible for both the top wall of the front housing 142 and the top wall of the backpost 128 to deflect. The catches 134 move forward inside the front housing 142 until they align with respective ones of two apertures 146 formed in the top wall of the front housing. At that point the resiliency of the material of the top wall of the front housing 142 (and/or of the backpost 128) causes movement so that the catches 134 move into the apertures 146 and resist movement of the backpost backward out of the front housing. The stops 136 on the backposts 128 are engageable with the front housing 142 adjacent the open rear end to prevent the backpost from being further inserted into the front housing.

Figure 29:
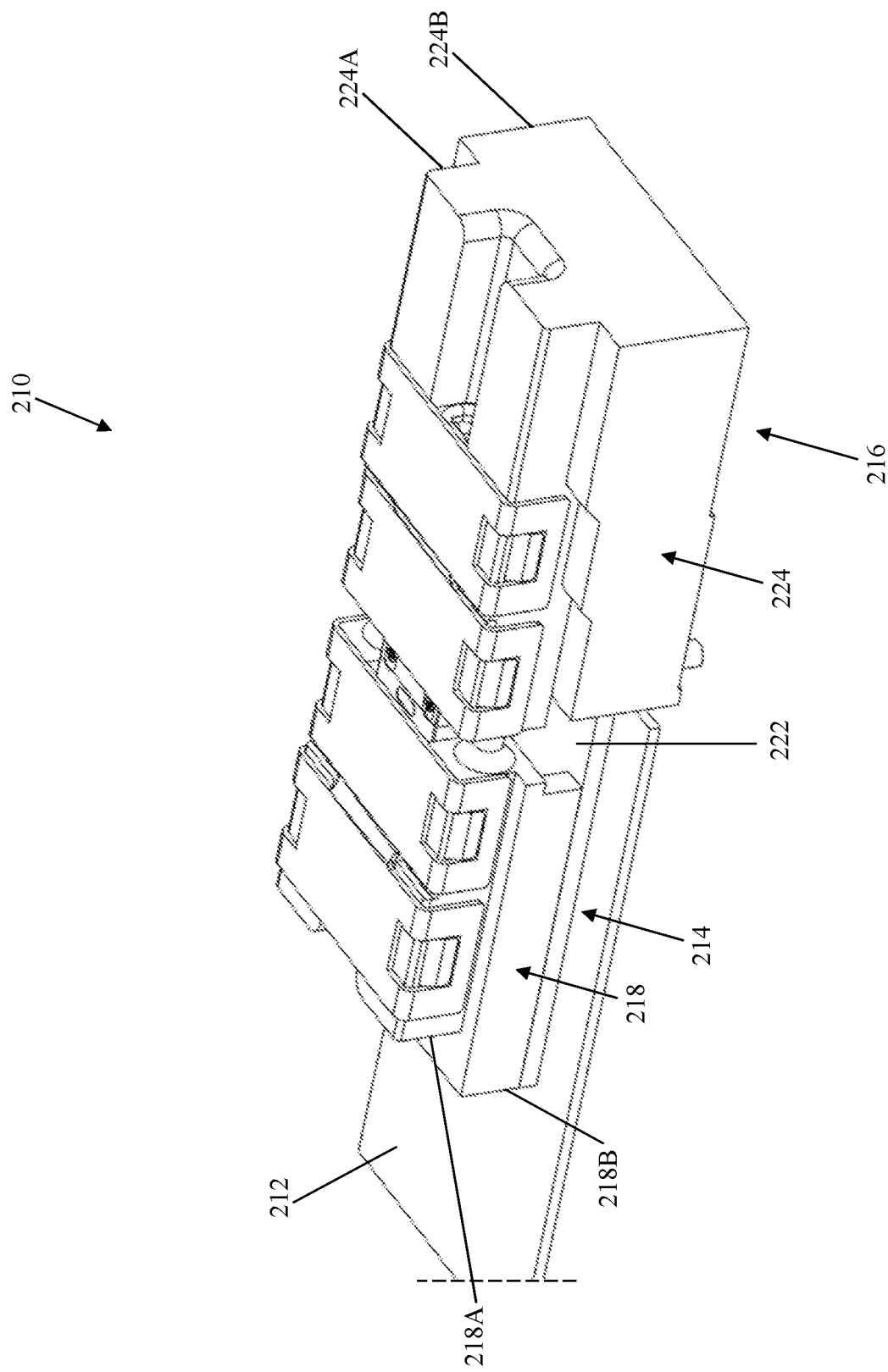
FIG. 29 is a perspective of an optoelectronic connection system schematically illustrated as connected to a printed circuit board.

The MT ferrules 112 have flanges 148 that engage structure (not shown) in the front housing 142 to prevent forward movement past a certain point. The ferrule flanges 148 engage this structure prior to the backposts 128 being connected to the front housing 142. Accordingly, movement of the backposts 128 into the front housing 142 causes the springs 114 to be compressed. Therefore, as fully assembled in FIG. 28, the springs 114 will urge the MT ferrules 112 forward. However, when the ferrules 112 are engaged by other ferrules (not shown) or other connection structure, the MT ferrules are able to move rearwardly against the bias of the springs 114, which avoid damage to the ferrules and optical fibers, but maintains firm contact between the MT ferrules and the connecting ferrules. Using the structure of FIGS. 22-28, previously terminated cables and ferrules can be retrofitted into a connector that permits movement of the ferrules as part of the connection engagement.

a. An optoelectronic connection system 210 for making optical and electrical and electrical connections with a printed circuit board 212 is shown in FIG. 29 to comprise a first connector assembly 214 and a second connector assembly 216. The first connector assembly 214 is shown attached to the printed circuit board 212. The printed circuit board may be part of a module (not shown) that uses and external or remote laser source for optical or optoelectronic data communication. The first connector assembly 214 includes a first ferrule carrier 218 that contains a first mechanical transfer (MT) ferrule 220. The first ferrule carrier 218 is mounted on a printed circuit board card 222, that is in turn mounted on the printed circuit board 212. The second carrier comprises a second ferrule carrier 224 that contains a second (mating) MT ferrule 226. The first and second MT ferrules 220, 226 are shown in a mated condition in FIG. 29.

Figure 30:
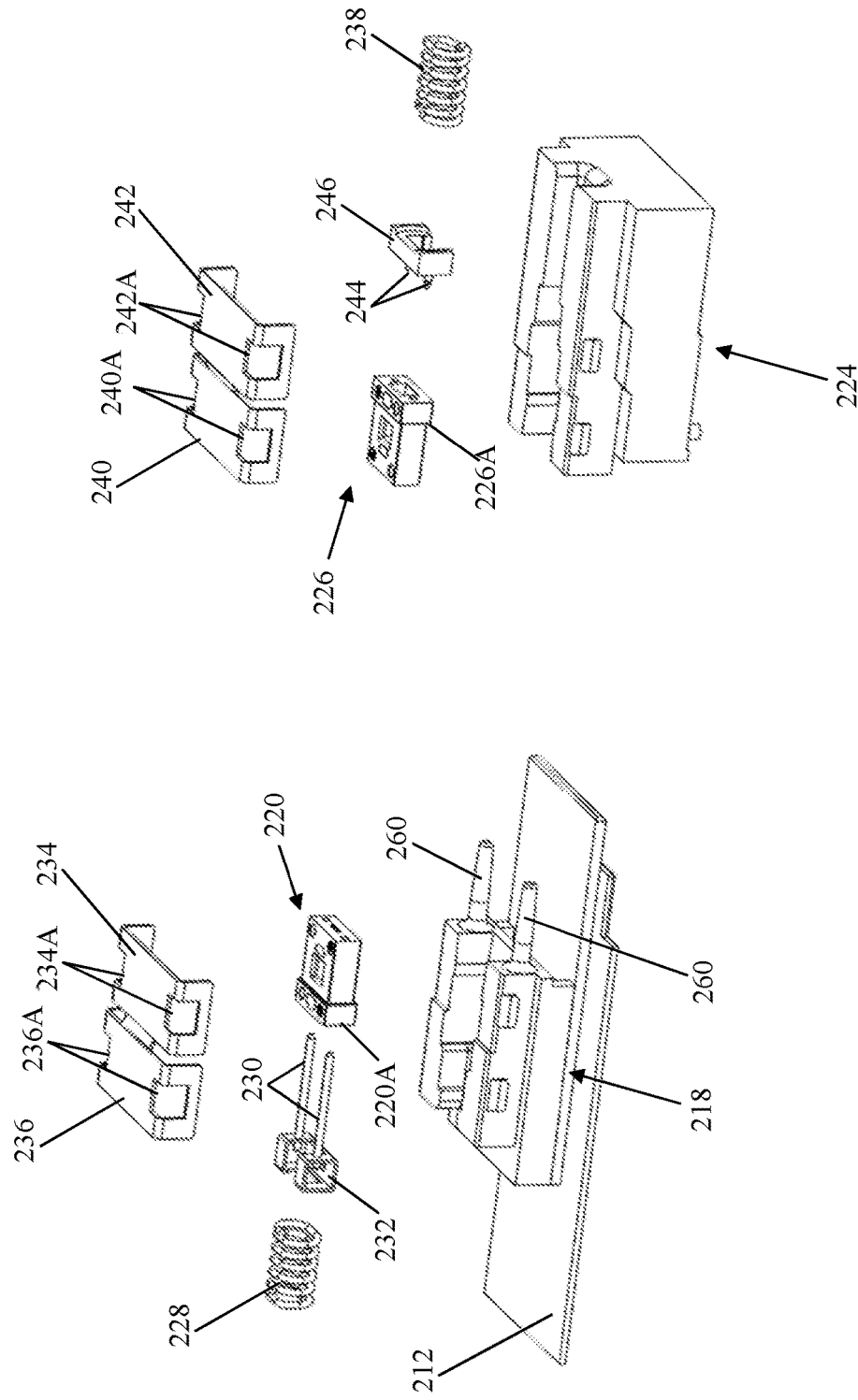
FIG. 30 is an exploded perspective of the optoelectronic connection system of FIG. 29.

As may be seen in FIG. 30, The first connector assembly 214 further includes a first coil spring 228 operable in an assembled condition to bias the first ferrule 220 outward from the first ferrule carrier 218. The first connector assembly 214 further includes mechanical transfer pins 230 connected to a pin keeper 232. The pins 230 are received through the first ferrule 220 in a conventional manner. A ferrule clip 234 is configured for connection to the first ferrule carrier 218 for retaining the first MT ferrule 220 in the first ferrule carrier. A spring clip 236 is configured for connection to the first ferrule carrier 218 for retaining the first coil spring 228 in the first ferrule carrier. The first MT ferrule 220 is a male connector and includes the mechanical transfer pins 230 that when assembled with the first ferrule extend through passages in the first MT ferrule and project out from a connection end of the first MT ferrule. The mechanical transfer pins 230 are connected to each other by the pin keeper 232 located on an optical fiber connection side of the first MT ferrule 220. As assembled, the first coil spring 228 engages the pin keeper 232 to apply force to the first MT ferrule 220. The second connector assembly 216 further includes a second coil spring 238 that in an assembled condition biases the second MT ferrule 226 outward from the second ferrule carrier 224. A ferrule clip 240 is configured to connect to the second ferrule carrier 224 to retain the second MT ferrule 226 in the second ferrule carrier. A spring clip 242 is configured for connection to the second ferrule carrier 224 for retaining the second coil spring 238 in the second ferrule carrier. The second MT ferrule 226 is a female ferrule. The second MT ferrule 226 has passages, just as the first MT ferrule 220. However, these passages are constructed and arranged for receiving the free ends of the mechanical transfer pins 230 of the first MT ferrule 220. The second MT ferrule 226 includes short, locator pins 244 mounted on a pin keeper 246. As assembled, the locator pins 244 extend a short distance into the passages of the second MT ferrule 226 to locate the second MT ferrule relative to the pin keeper 246. As assembled, the second coil spring 238 engages the pin keeper 246 to apply force to the second MT ferrule 226. The first and second coil springs 228, 238 are somewhat flattened so that they have an oval rather than a round shape in cross section. Other spring configurations may be used, including springs that are not coil springs.

Figure 31:
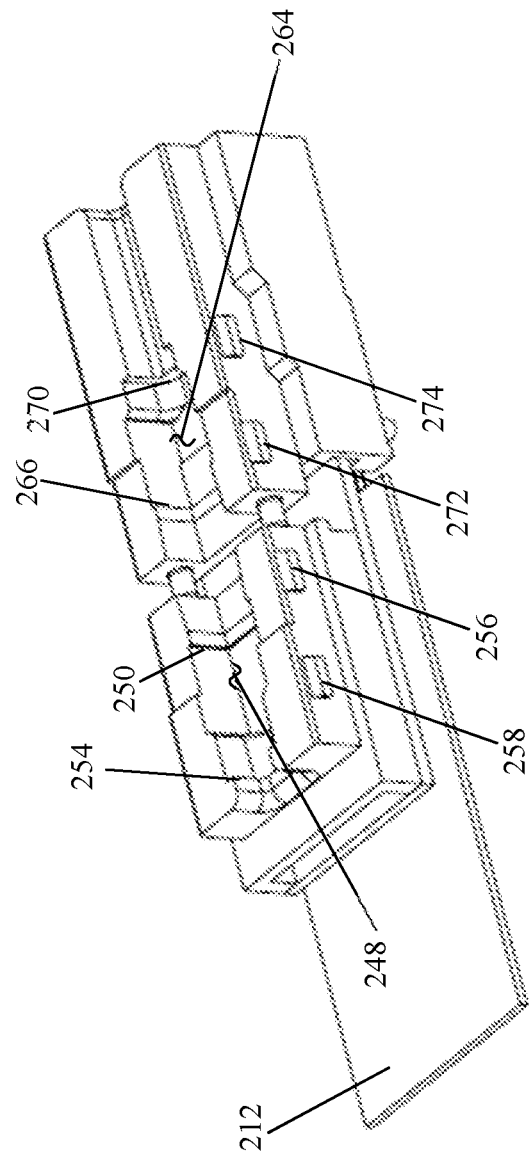
FIG. 31 is a perspective of a first carrier of a first connector assembly of the optoelectronic connection system of FIG. 29, but with clips and optical components removed to show details of a first ferrule carrier and a second ferrule carrier.
Figure 32:
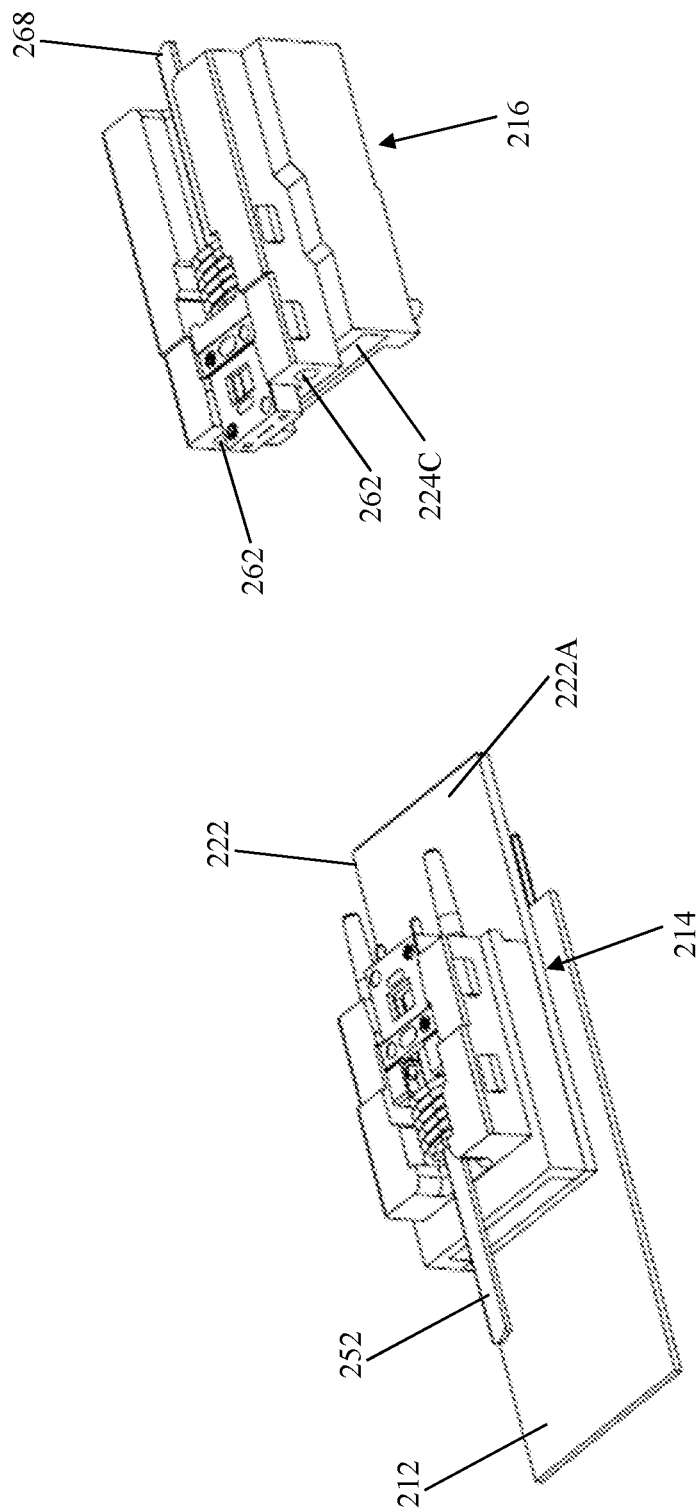
FIG. 32 is a perspective of the optoelectronic connection system of FIG. 29 with first and second connector assemblies positioned for connection with parts removed to show internal construction.

Referring now particularly to FIGS. 29, 31 and 32, the first ferrule carrier 218 includes an upper, optical portion 218A and a lower, electrical portion 218B. The electrical portion is mounted on the printed circuit board card 222 attached to the printed circuit board 212. The printed circuit board card 222 projects from the first ferrule carrier 218 and the printed circuit board 212 in a connection direction for being received by the second ferrule carrier 224 to make electrical connection of the electrical portion 218B of the first ferrule carrier with an electrical portion 224B of the second ferrule carrier 224. The optical portion of the first ferrule carrier 218 includes an upwardly opening channel 248 extending the length of the first ferrule carrier and opening at opposite ends of the first carrier. The channel 248 includes a ferrule section at the connection end of the first ferrule carrier that receives the first MT ferrule 220. Moving toward an opposite, cable connection end of the first ferrule carrier 218, the channel 248 has a retainer section. The retainer section receives the pin keeper 232 and a flange 220A of the first MT ferrule 220, and has a shoulder 250 sized and shaped to engage the flange of the first MT ferrule to prevent it from moving forward out of the channel. The shoulder 250 is located at the boundary between the ferrule section and the retainer section. A spring section of the channel is located between the retainer section and the cable connection end of the optical portion 218A of the first ferrule carrier 218. A cable opening at the connection end of the optical portion is next to the spring section and provides access for an optical fiber cable 252 to enter the channel 248. A shoulder 254 located between the spring section and the cable opening engages the first coil spring 228 and holds the spring from moving out of the channel 248 through the cable opening. The shoulder 254 also provides a reaction surface for the first coil spring 228 so that the spring can apply a force to the first MT ferrule 220, biasing it in the connection direction.

Each side of the optical portion 218A of the first ferrule carrier 218 includes a front catch 256 nearer to the connection end of the optical portion, and a rear catch 258 nearer to the cable connection end of the optical portion. The ferrule clip 234 has apertures 234A on each side which receive respective ones of the front catches 256 to connect the ferrule clip to the optical portion 218A of the first ferrule carrier 218. The ferrule clip 234 is resiliently deformable to deflect outward upon initial engagement with the front catches 256, and then to snap back to capture the front catches in the apertures 234A. The ferrule clip 234 prevents the first MT ferrule 220 from moving out of the channel 248 through the open top of the channel. The spring clip 236 has apertures 236A on each side which receive respective ones of the rear catches 258 to connect the spring clip to the optical portion 218A of the first ferrule carrier 218. The spring clip 236 is resiliently deformable to deflect outward upon initial engagement with the rear catches 258, and then to snap back to capture the rear catches in the apertures 236A. The spring clip 236 prevents the first coil spring 228 from moving out of the channel 248 through the open top of the channel. Guide fingers 260 project in the connection direction from the optical portion 218A of the first ferrule carrier 218. The guide fingers 260 interact with the second connector assembly 216 prior to engagement of the first and second MT ferrules 220, 226 to achieve a gross alignment so that the pins 230 of the first MT ferrule can be received in the internal passages of the second MT ferrule. The guide fingers 260 taper toward their free ends to facilitate entry into openings 262 (FIG. 32) in the second ferrule carrier 224.

The second ferrule carrier 224 includes an upper, optical portion 224A and the lower, electrical portion 224B. The electrical portion has a front opening 224C and an internal cavity extending inward from the front opening to admit and contain a connection portion 222A of the card 222 (as shown in FIG. 31). The cavity also contains a card edge electrical connector (not shown) that makes electrical connection with the connection portion 22A of the card 222 when the first and second connector assemblies 214, 216 are mated together. In this way electrical connection is made between the first connector assembly 214 and the second connector assembly 216 (and printed circuit board 212).

The optical portion 218A of the second ferrule carrier 224 includes an upwardly opening channel 264 extending the length of the second carrier and opening at opposite ends of the second carrier. The channel 264 includes a ferrule section at the connection end of the second ferrule carrier that receives the second MT ferrule 226. Moving toward an opposite cable connection end of the second ferrule carrier 224, the channel 264 has a retainer section. The retainer section receives the pin keeper 246 and a flange 226A of the second MT ferrule 226, and has a shoulder 266 sized and shaped to engage the flange of the second MT ferrule to prevent it from moving forward in the connection direction out of the channel 264. The shoulder 266 is located at the boundary between the ferrule section and the retainer section. A spring section of the channel 264 is located between the retainer section and the cable connection end of the optical portion 224A of the second carrier 224. A cable opening at the connection end of the optical portion is next to the spring section and provides access for an optical fiber cable 268 to enter the channel 264. A shoulder 270 located between the spring section and the cable opening engages the second coil spring 238 and holds the coil spring from moving out of the channel 264 through the cable opening. The shoulder 270 also provides a reaction surface for the second coil spring 238 so that the spring can apply a force to the second MT ferrule 226 biasing it in the connection direction.

Each side of the optical portion 224A of the second ferrule carrier 224 includes a front catch 272 nearer to the connection end of the optical portion and a rear catch 274 nearer to the cable connection end of the optical portion. The ferrule clip 240 has apertures 240A on each side which receive respective ones of the front catches 272 to connect the ferrule clip 240 to the optical portion 224A of the second ferrule carrier 224. The ferrule clip 240 is resiliently deformable to deflect outward upon initial engagement with the front catches 272, and then to snap back to capture the front catches in the apertures 240A. The ferrule clip 240 prevents the second MT ferrule 226 from moving out of the channel 264 through the open top of the channel. The second spring clip 242 has apertures 242A on each side which receive respective ones of the rear catches 258 to connect the spring clip to the optical portion 218A of the first ferrule carrier 218. The spring clip 242 is resiliently deformable to deflect outward upon initial engagement with the rear catches 274, and then to snap back to capture the rear catches in the apertures 242A. The spring clip 242 prevents the second coil spring 238 from moving out of the channel 264 through the open top of the channel. The openings 262 in the front of the optical portion 224A of the second ferrule carrier 224 are positioned to receive the guide fingers 260 of the first ferrule carrier 218. The openings 262 extend into the optical portion 224A of the second ferrule carrier 224 to receive the guide fingers 260 in as can be seen in FIG. 31. In some embodiments (not shown), the openings flare outward in diameter at the connection end of the optical portion. The wider portions of the openings are presented to tips of the guide fingers to guide the guide fingers into a main portion of the opening. This movement, along with entry of wider, proximal portions of the guide fingers 260 into the openings 262 achieves alignment of the pins 230 of the first MT ferrule 220 with the internal passages of the second MT ferrule 226 so that optical connection is achieved.

In some embodiments (not shown), one of the first and second ferrule carriers may have a channel that lacks a spring section. The ferrule received in the carrier lacking a spring section is held against any substantial movement along the connection direction. The other ferrule carrier may include a spring and permit movement of the other ferrule to make certain that the first and second ferrules properly engages to achieve reliable optical communication.

Figure 33:
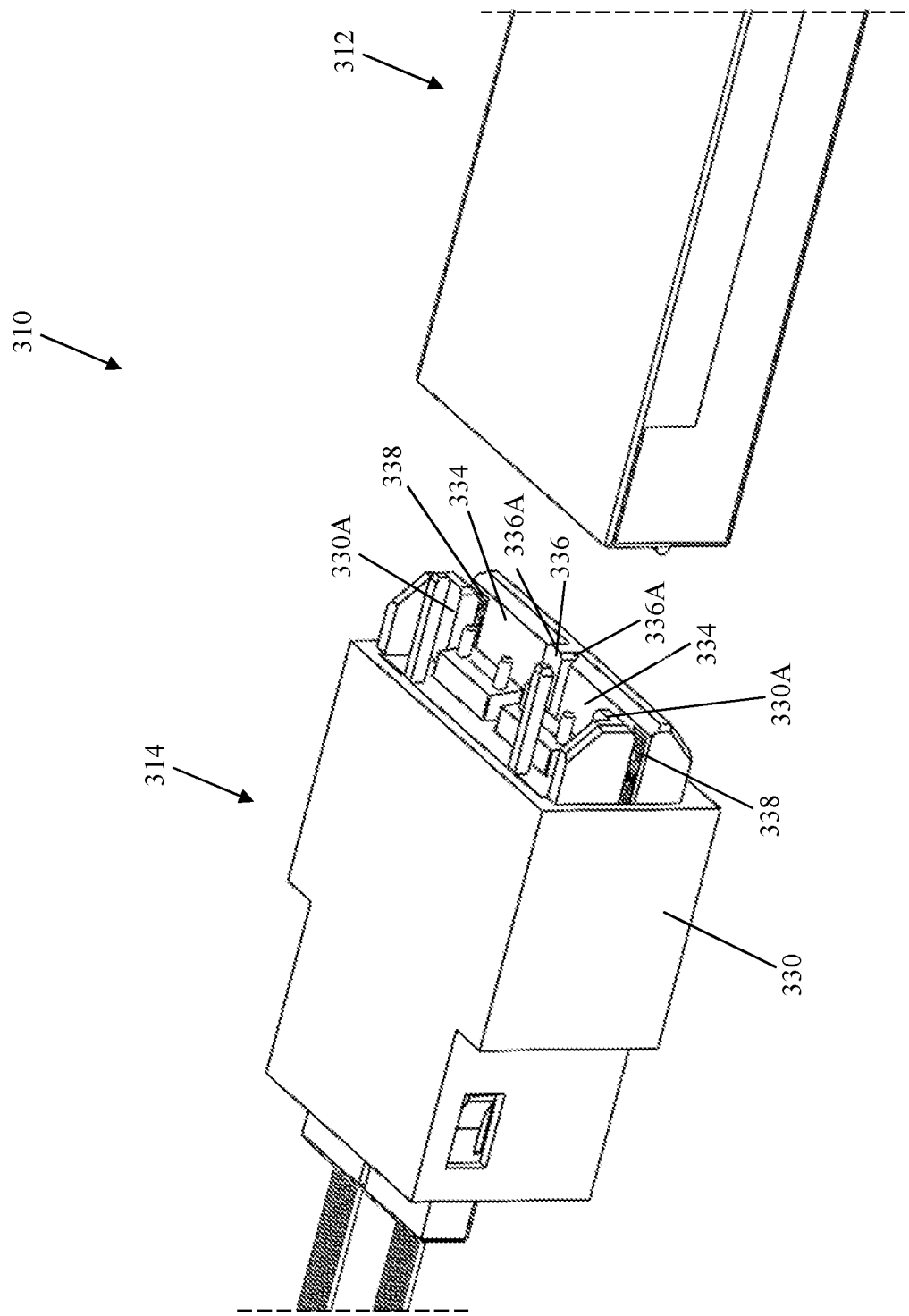
FIG. 33 is a fragmentary perspective of a dual ferrule optoelectronic connection system.
Figure 34:
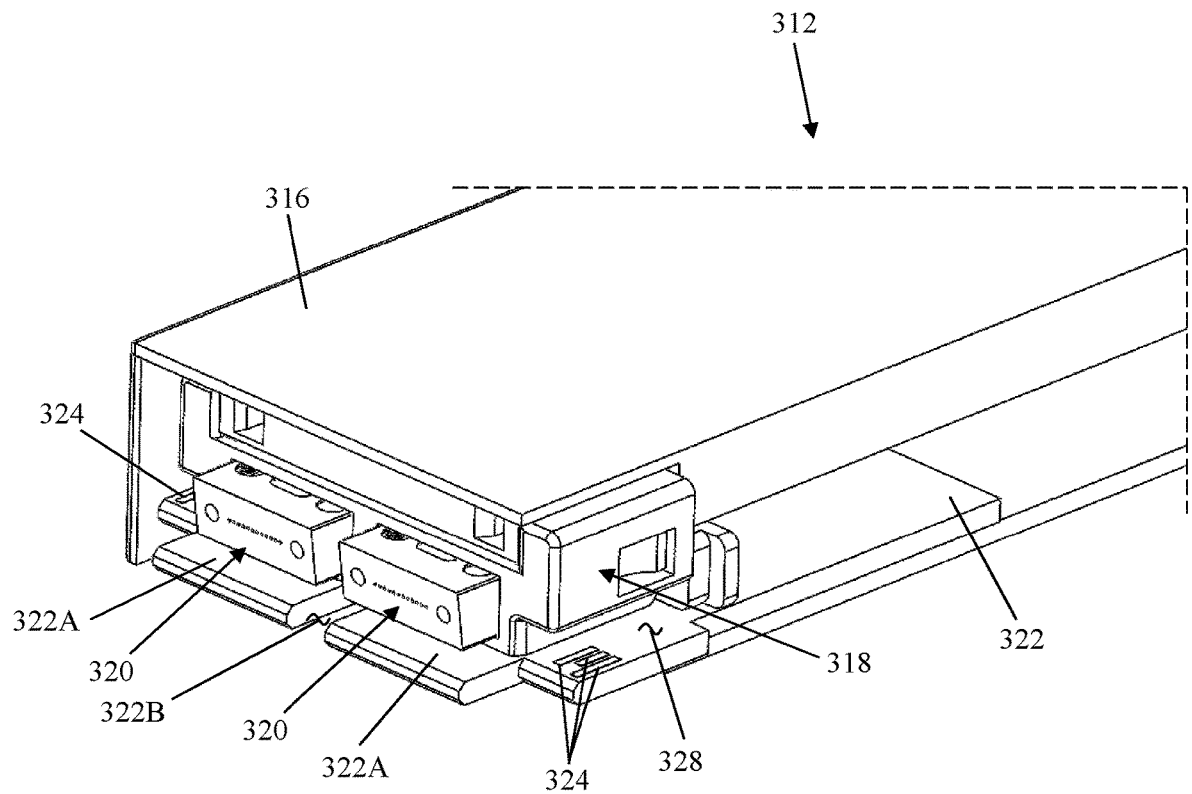
Figure 35:
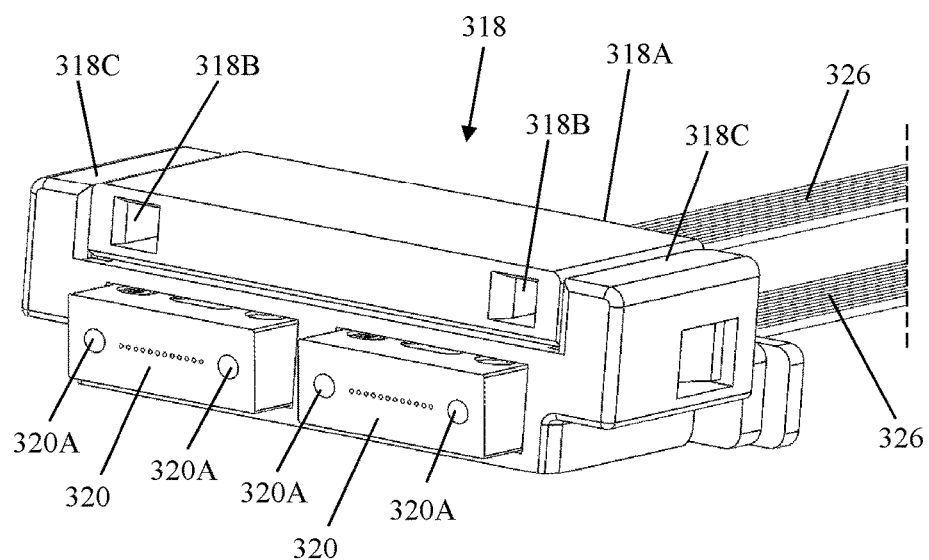
FIG. 35 is a further enlarged perspective of a ferrule holder and ferrules of the plug-in connector assembly.
Figure 36:
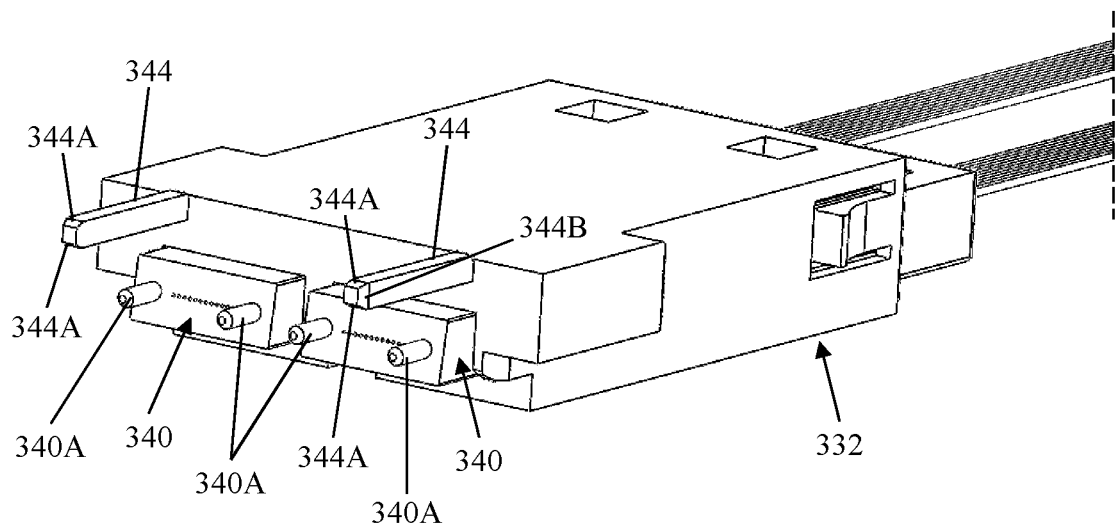
FIG. 36 is an enlarged perspective of a ferrule holder and ferrules of the receptacle connector assembly.

A blind mate plug-in optoelectronic connection system 310 is shown in FIG. 33 to comprise a plug connector assembly 312 and a receptacle connector assembly 314. The plug connector assembly 312 includes an outer housing 316 that contains a ferrule holder 318 supporting two female MT ferrules 320, and a printed circuit board 322 with electrical edge connection conductors 324 (FIG. 34). The ferrule holder 318 includes an upper portion 318A containing a pair of alignment holes 318B. The alignment holes are useful in facilitating a blind connection of the plug connector assembly 312 with the receptacle connector assembly 314, as will be described. The alignment holes 318B open at the forward (connection) end of the ferrule holder 318. At this location there can be angled surfaces so that the alignment holes are greater in cross sectional area at the front end and are shaped to funnel into the smaller cross sectional portions of the holes. The ferrule holder 318 has wings 318C on opposite sides of the ferrule holder (see also, FIG. 35).

The ferrule holder 318 further includes a lower portion 318D formed with two cavities that receive respective ones of the two female MT ferrules 320. The female MT ferrules each have a pair of internal passages 320A that open at opposite ends of a ferrule body 322B. Each of the female MT ferrules 320 terminates optical fibers from a respective one of two cables 326, and exposes ends of the optical fibers for making an electrical connection, as is conventional for multi-fiber optical ferrules. The printed circuit board 322 underlies the ferrule holder 318 in the orientation of the plug connector assembly 312 shown in the drawings. The printed circuit board 322 lies on a bottom wall 316A of the outer housing 316 and is shaped so that there are two projecting portions 322A, each located under respective ones of the female MT ferrules 320. The projecting portions 322A extend forward in a connection direction from the ferrules 320 and define an elongate gap 322B between them. At the forward edge of the printed circuit board 322, but on either side of the projecting portions 322A are recessed portions of the printed circuit board that carry the electrical edge conductors 324. The wings 318C of the ferrule holder 318 are spaced apart above the electrical edge connectors 324 and define along with the printed circuit board and side wall of the outer housing 316 a port 328 for use in making electrical connection with the receptacle connector assembly 314. It will be understood that the projecting portions of the printed circuit board could extend all the way to respective side edges of the printed circuit board (not shown). In that circumstance, the electrical edge conductors would be recessed from the forward edge of the printed circuit board for reasons described hereinafter.

The receptacle connector assembly 314 includes an outer housing 330 defining a cavity that opens to the front, connection end of the outer housing (FIG. 33). Ledge portions 330A on the sides of the central cavity of the outer housing 330 support a ferrule holder 332 in the cavity of the outer housing. A printed circuit board 334 in the outer housing 330 rests on a lower wall of the outer housing and includes portions located on either side of a guide rail 336 of the outer housing. The guide rail 336 includes inward chamfers 336A at its forward end. Resilient electrical contact wires 338 are located at the lateral side edge margins of the printed circuit board 334 for making electrical contact with the electrical edge conductors 324 of the plug connector assembly 312. The ferrule holder 332 holds two, side-by-side male MT ferrules 340 having pins 340A that project forward of the ferrules. Each of the ferrules 340 can move within the ferrule holder 332 along the connection direction. As may be seen in FIG. 41 for one of the ferrules 340, there is a coil spring 342 for each ferrule that bears against and biases the ferrule forward, but allows for retraction of the ferrule short distance into the ferrule holder 332. In some embodiments, the coil spring 342 and ferrule 340 accommodate at least about 4 mm of travel to the final connected position of the plug connector assembly 312 and the receptacle connector assembly 314. In other embodiments, the coil spring 342 and ferrule 340 will permit travel of the ferrule relative to the ferrule holder 332 of greater than 1 mm, greater than 2 mm, greater than 3 mm. The ferrule holder 332 has a pair of spaced apart guide fingers 344 that project forward a distance farther than the extent of the ferrule pins 340A. The distal ends of the guide fingers 344 each have upper and lower bevels 344A and an outer side bevel 344B. The bevels 344A, 344B result in the guide fingers having tapered tips. It will be understood that for all embodiments describing male and female components, the location of the male and female components on the plug connector assembly and on the receptacle connector assembly may be reversed from what is described herein.

Figure 37:
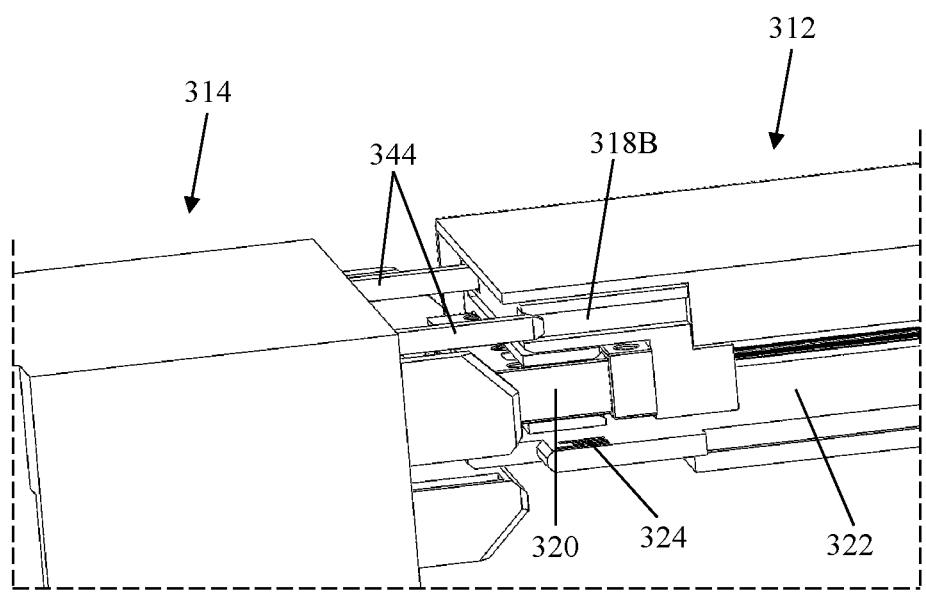
FIG. 37 is an enlarged fragmentary perspective showing a plug connector assembly and a receptacle connector assembly of the optoelectronic connection system of FIG. 34 with parts removed.
Figure 38:
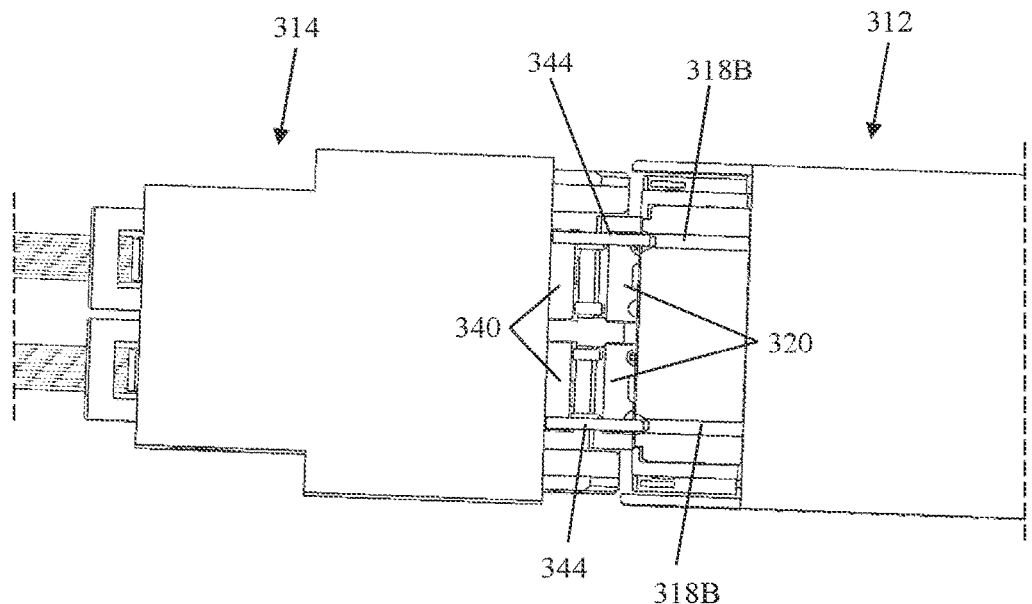
FIG. 38 is a top plan view of the plug connector assembly and the receptacle connector assembly in the same position of connection as shown in FIG. 37.

The plug connector assembly 312 and the receptacle connector assembly 314 operate the permit an accurate, blind connection of the connector assemblies. As the plug connector assembly 312 and receptacle connector assembly 314 move toward each other from the position shown in FIG. 33, the gap 322B between the projecting portions 322A of the circuit board 322 of the plug connector assembly receives the guide rail 336 of the receptacle connector assembly. If there is some lateral misalignment of the connector assemblies 312, 314, one of the projecting portions 322A of the printed circuit board 322 will engage one of the chamfers 336A of the guide rail 336. The shape of the chamfer 336A will guide the guide rail 336 into the gap 322B, thereby causing lateral alignment of the plug connector assembly 312 and the receptacle connector assembly 314. At nearly the same time and with reference to FIGS. 37 and 38, the tapered tips (i.e., bevels 344A, 344B) of the guide fingers 344 being to interact with the ferrule holder 318 of the plug connector assembly 312. More particularly the tip of each guide finger 344 engages the front end of one of the holes 318B in the ferrule holder 318 of the plug connector assembly 312. The bevels 344B on the outer sides of the guide fingers 344 engage corresponding surfaces on the sides of the alignment holes 318B in the ferrule holder 318. Similarly, the upper and lower bevels 344A on the top and bottom of the guide fingers 344 can engage surfaces on the top and bottom of the alignment holes 318B to achieve vertical alignment of the plug connector assembly 312 and the receptacle connector assembly 314.

Figure 39:
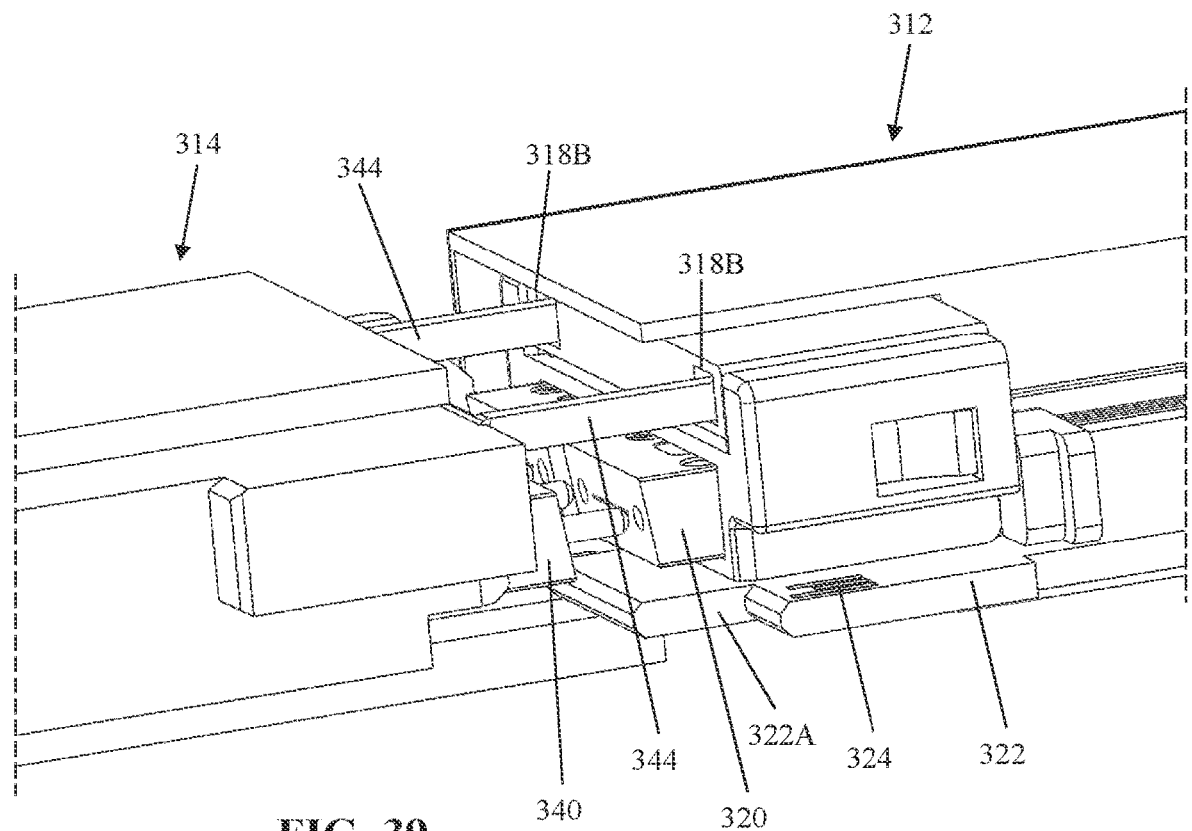
FIG. 39 is a perspective similar to FIG. 37, but showing the plug connector assembly and the receptacle connector assembly just prior to mating of ferrules.
Figure 40:
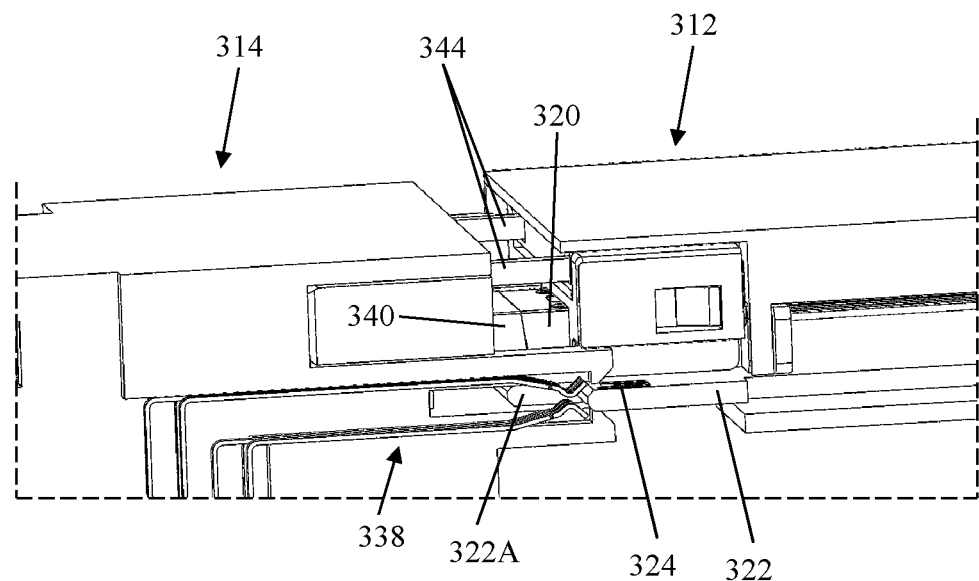
FIG. 40 is a perspective similar to FIG. 39, but showing the plug connector assembly and the receptacle connector assembly with the ferrules mated.

In FIG. 39, the connection of the plug connector assembly 312 and the receptacle connector assembly 314 has progressed so that the widest portions of the guide fingers 344 are received in the narrowest portions of the alignment holes 318B to produce maximum alignment. As may be seen, the pins 340A of the near ferrule 340 of the receptacle connector assembly 314 is substantially aligned with the internal passage 320A of the near ferrule 320 of the plug connector assembly 312. This assures that the pins 340A will enter the internal passages 320A, rather than engaging a face of the plug connector assembly ferrules 320 and preventing completion of the optical and electrical connection.

Figure 41:
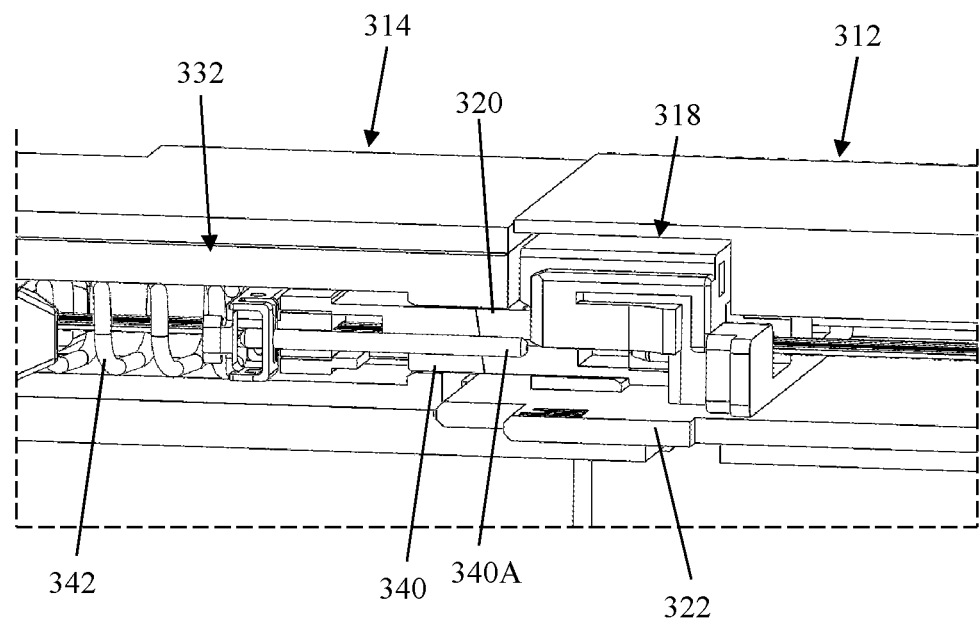
FIG. 41 is a perspective similar to FIG. 40, but showing one of the ferrules of the receptacle connector assembly retracted slightly upon further movement from the position shown in FIG. 40.
Figure 42:
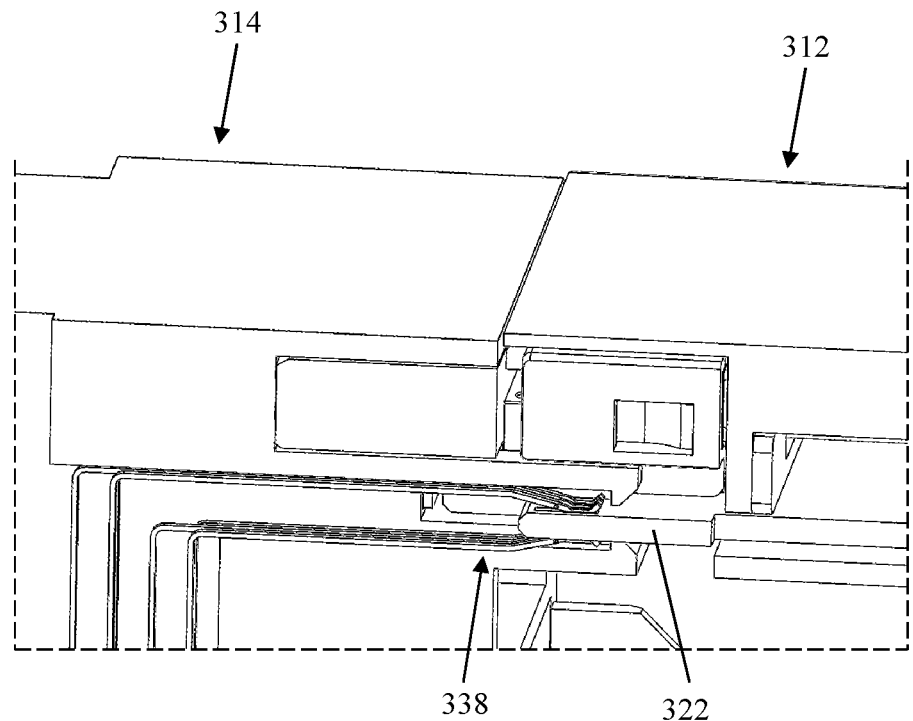
FIG. 42 is a further enlarged perspective similar to FIG. 41, but showing electrical connection of the plug connector assembly with the receptacle connector assembly.

Progressing further toward complete optical and electrical connection of the plug connector assembly 312 and the receptacle connector assembly 314, the dual ferrules 320 of the plug connector assembly engage corresponding ones of the dual ferrules 340 of the receptacle connector assembly thereby establishing optical connection. However, the electrical contact wires 338 have not yet made engagement with the edge electrical conductors 324 of the printed circuit board 322 of the plug connector assembly 312. It is desirable to sequence optical and electrical connection in this manner so that, for example, the laser does not power up until after optical connection is made. Moving still further as shown in FIG. 41, the ferrules 340 of the receptacle connector assembly 314 are forced to retract somewhat into the ferrule holder 332 by the continued engagement with the ferrules 320 of the plug connector assembly 312. At this point there is complete optical and electrical connection. As shown in FIG. 42, the contact wires 338 have moved onto the printed circuit board 322 of the plug connector assembly 312. The contact wires 338 are first wedged upward by engagement with a leading edge of the printed circuit board 322. Thereafter, the contact wires 338 ride along the printed circuit board 332 and come into contact with the edge electrical conductors 324 to achieve electrical connection of the plug connector assembly 312 with the receptacle connector assembly 314. The electrical contact 338 wires have sufficient resiliency so that they hold themselves in contact with the edge electrical contacts 324. The connection of the plug connector assembly 312 and the receptacle connector assembly 314 is complete. In this embodiment, there is no latching or mechanical connection between the plug connector assembly 312 and the receptacle connector assembly 314. When the plug connector assembly 312 and the receptacle connector assembly 314 are disconnected, the electrical connection will be broken prior to the optical connection. Thus, a laser can be powered down before there is any disruption in the optical path.

Figure 43:
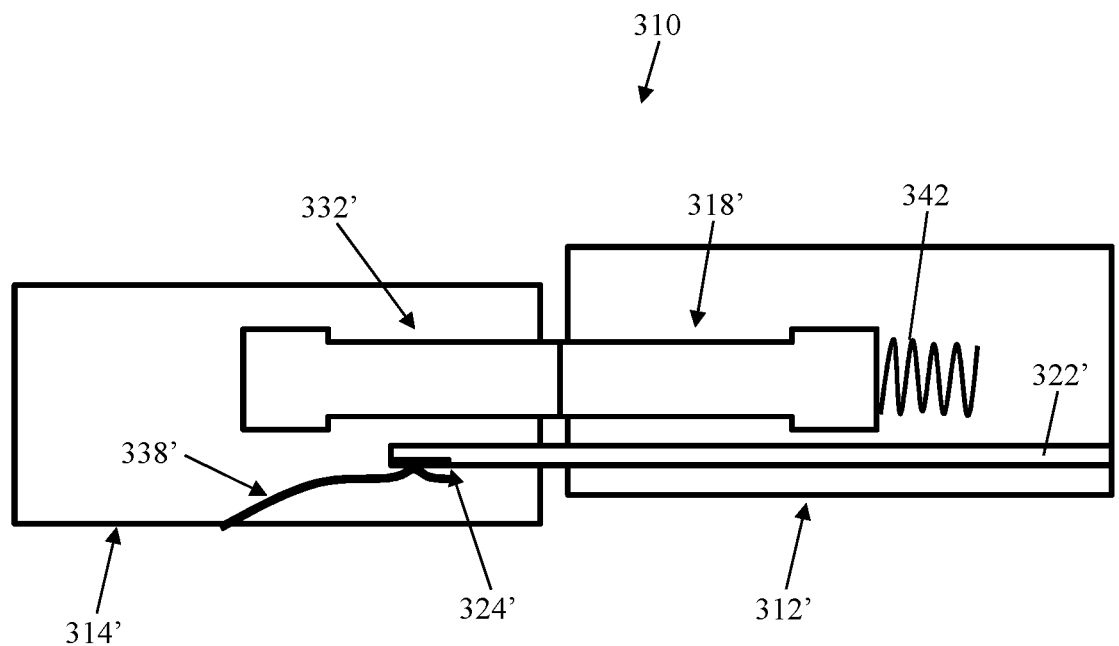
FIGS. 43-45 schematically illustrate disconnection of the plug connector assembly and the receptacle connector.
Figure 44:
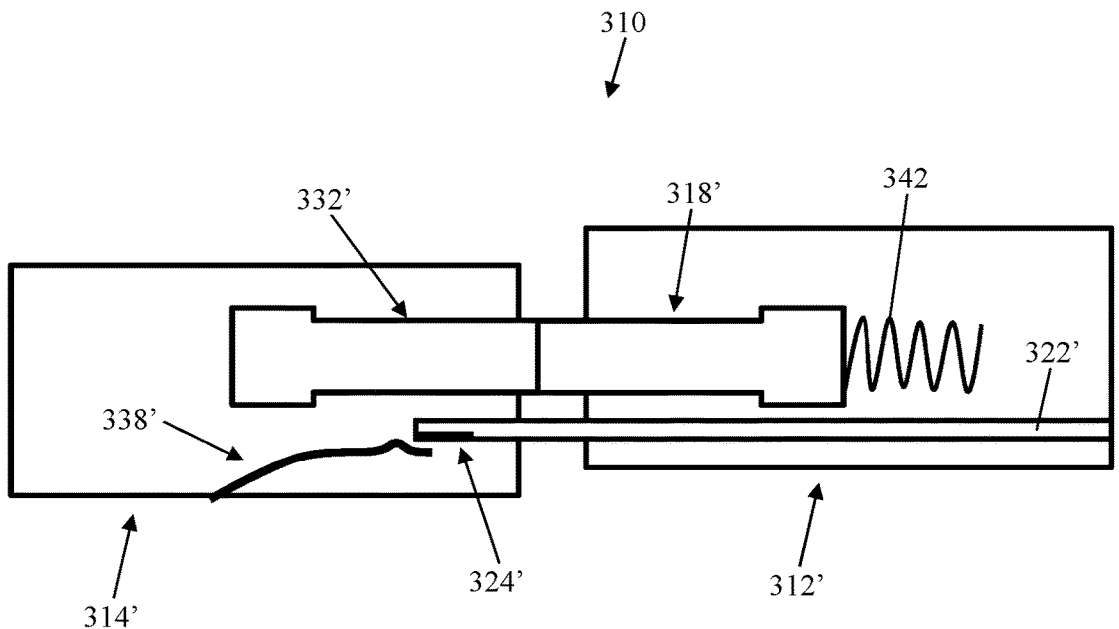
Figure 45:
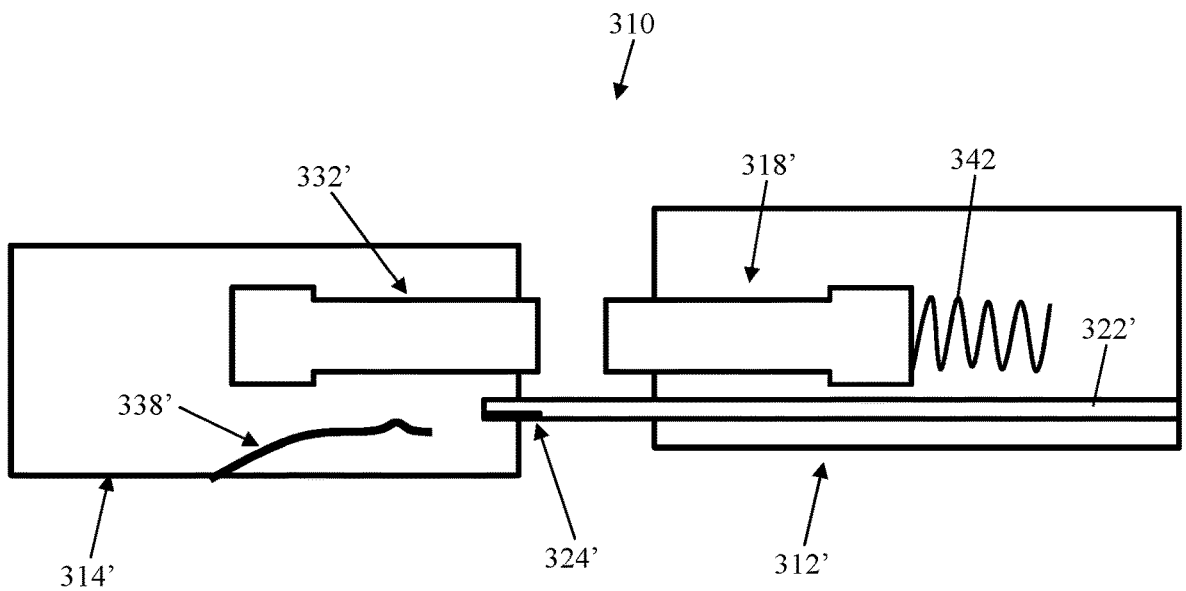

In FIGS. 43-45 disconnection of a plug connector assembly 312' and a receptacle connector assembly 314' is schematically illustrated. The plug connector assembly 312' and receptacle connector assembly 314' are similar to the plug connector assembly 312 and receptacle connector assembly 314 of FIGS. 33-42. However, the springs 342' biasing the ferrule holders 318' are associated with the plug-in connector assembly 312' rather than the receptacle assembly 314 as shown in FIGS. 33-42. Corresponding parts of the connection system of FIGS. 43-45 to those of the connection system 310 of FIGS. 33-42 will be indicated by the same reference numerals, plus the addition of a prime. FIG. 43 shows the plug connector assembly 312' and receptacle connector assembly 314' fully connected, meaning there is both an optical connection and an electrical connection between the two. A moment after disconnection is initiated, the electrical contact wires 338' have disconnected from the electrical edge conductors 324' of the plug connector assembly 312'. Thus, the laser in the plug connector assembly 312' powers down. The ferrule holder 318' has substantially retracted within the outer housing 316' of the plug connector assembly 312' and compressed the coil spring 342'. At this time the optical connection remains in place, as illustrated by the contact of the plug connector assembly ferrule holder 318' with the ferrule holder 332' of the receptacle connector assembly 314'. Further movement of the plug connector assembly 312' away from the receptacle connector assembly 314' causes the optical connection to be broken as illustrated by the separation of the ferrule holder 318' from the ferrule holder 332'. A complete disconnect has now been achieved without risking damage to the system by breaking the optical connection while the laser is still powered.

Figure 46:
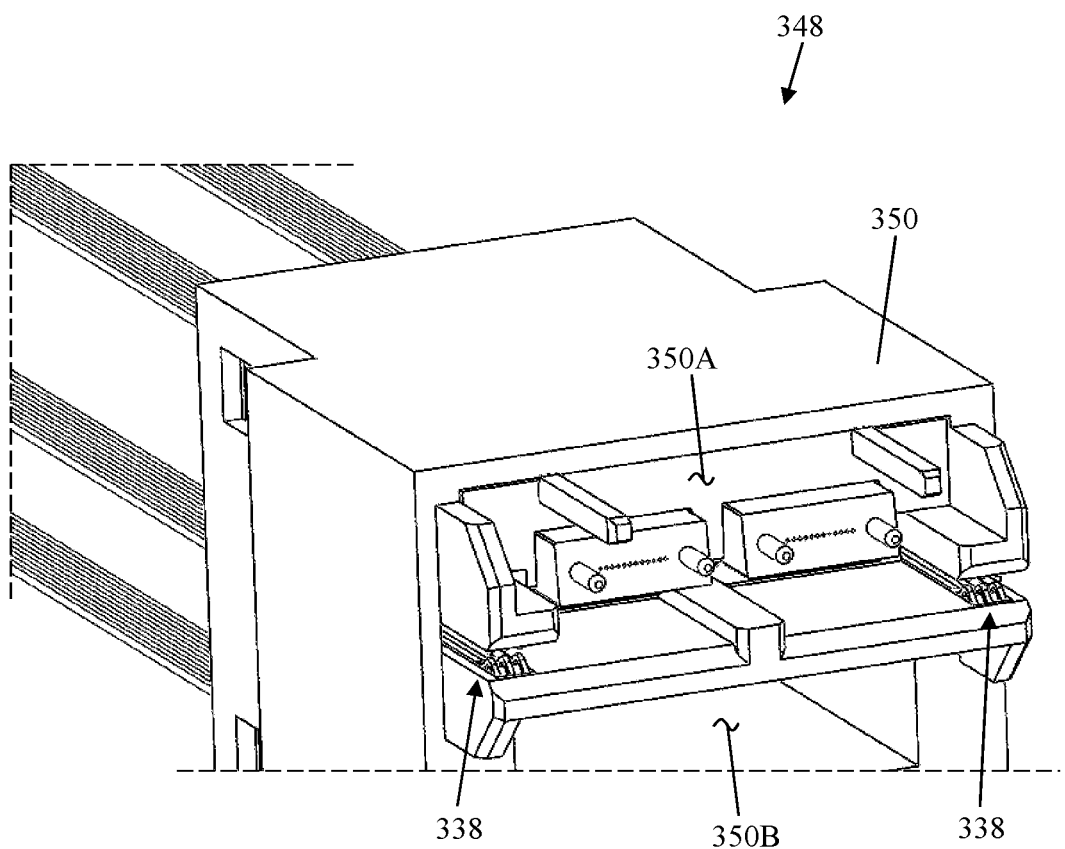
FIG. 46 is a fragmentary perspective of a receptacle connector assembly of another embodiment.
Figure 47:
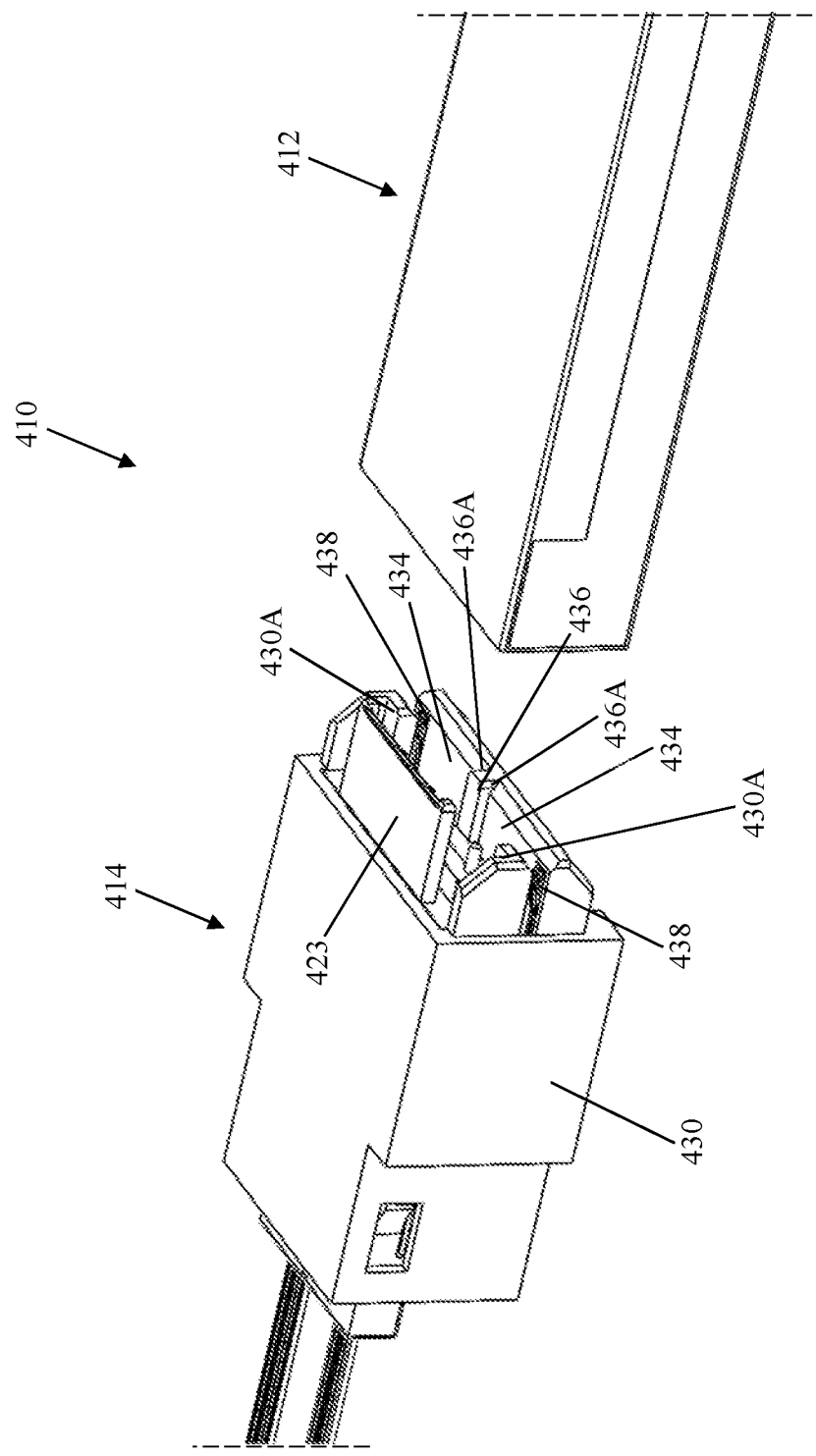
FIG. 47 is a fragmentary perspective of an optoelectronic connection system of another embodiment.

A receptacle connector assembly 348 that is a variation on the embodiment shown in FIGS. 33-41 is illustrated in part in FIG. 46. An outer housing 350 of the receptacle connector assembly is formed with upper and lower cavities 350A, 350B. Each cavity receives a ferrule holder 332 and MT ferrules 340 so that the receptacle connector assembly has four total ferrules and may connect with two of the plug connector assemblies having the same construction as the plug connector assemblies 312 described above. No ferrule holder is present in the lower cavity 350B in the illustration of FIG. 46.

Referring now to FIGS. 47-51 an optoelectronic connection system closely similar to the optoelectronic connection system of FIGS. 33-42 is indicated generally at 410. Corresponding parts of the optoelectronic connection system 410 will be designated by the same reference numeral as for the optoelectronic connection system 310 of FIGS. 33-42, plus "100". The construction is essentially identical, except where noted below. Accordingly, the closely similar parts will not be separately described.

Figure 48:
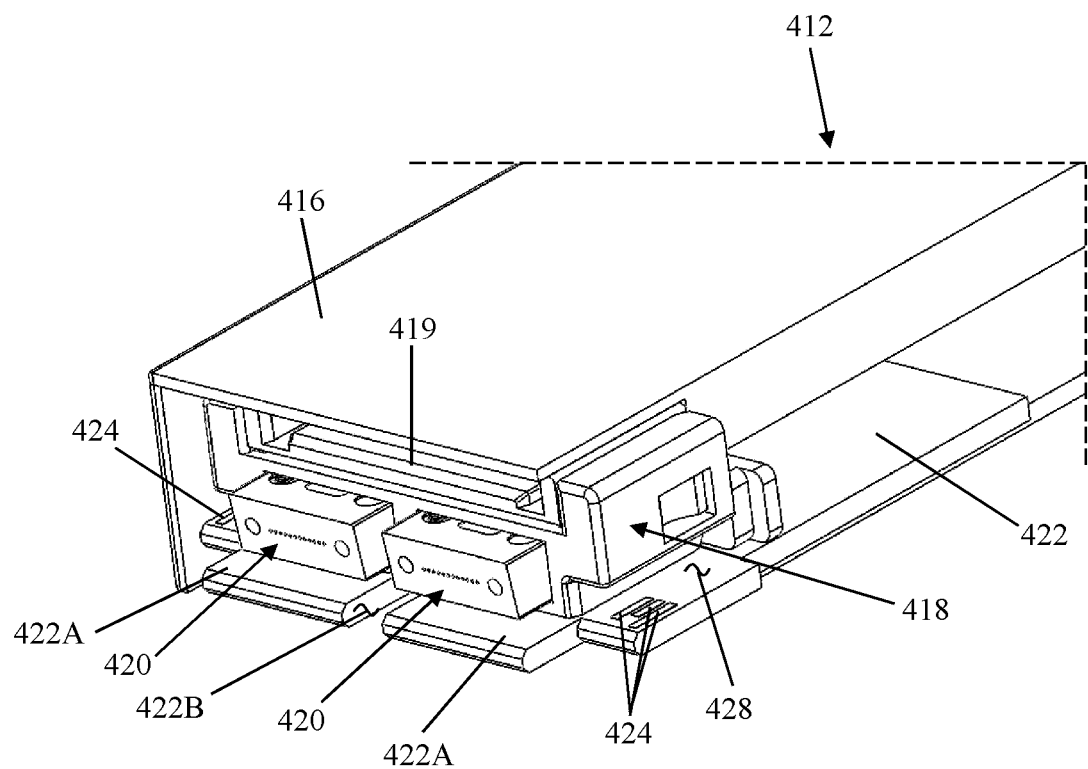
FIG. 48 is a fragmentary perspective of a plug connector assembly of the optoelectronic connection system of FIG. 47 with parts broken away to show internal construction.
Figure 49:
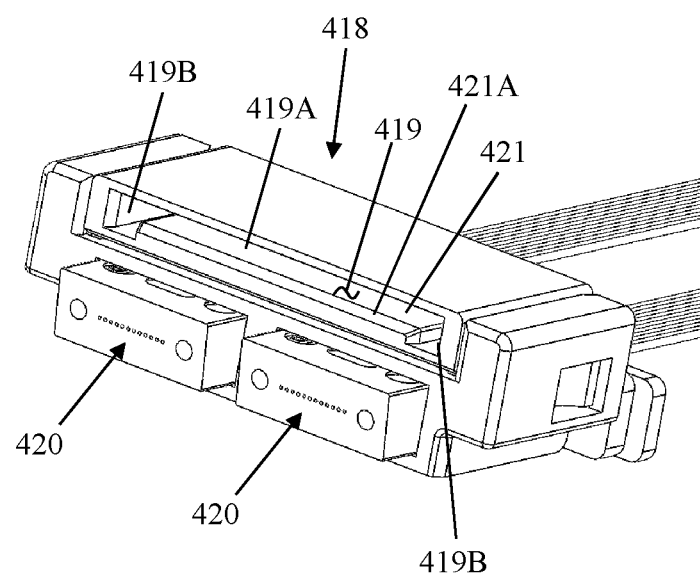
FIG. 49 is a perspective of a ferrule holder and ferrules of the plug connector of FIG. 47.

The difference between the plug connector assembly 312 of the FIGS. 33-42 embodiment from the plug connector assembly 412 of this embodiment is that the alignment holes 318B in the ferrule holder 318 are replaced with a single, roughly C-shaped opening 419, as may be seen in FIGS. 48 and 49. The C-shaped opening is made up of alignment holes 419B on opposite lateral sides, similar to the alignment holes 318B of the FIGS. 33-42 embodiment. The C-shaped opening 419 further includes a bridge opening 419A extending laterally between and interconnecting the alignment holes 419B. The bridge opening 419A is defined in part by a raised portion 421 between the alignment holes 419B. The raised portion 421 has a front edge 421A at the connection end of the ferrule holder 418 that is angled so that the bridge opening 419A has its greatest cross sectional area at the connection end of the ferrule holder, and is constructed to guide a mating part into the smaller cross sectional area portion of the bridge opening. The ferrule holder 418 also has an angled surface 419C above the raised portion 421 that angles inward from the connection end to facilitate funneling the mating part into the smaller cross sectional area portion of the bridge opening 419 (see, FIG. 51).

Figure 50:
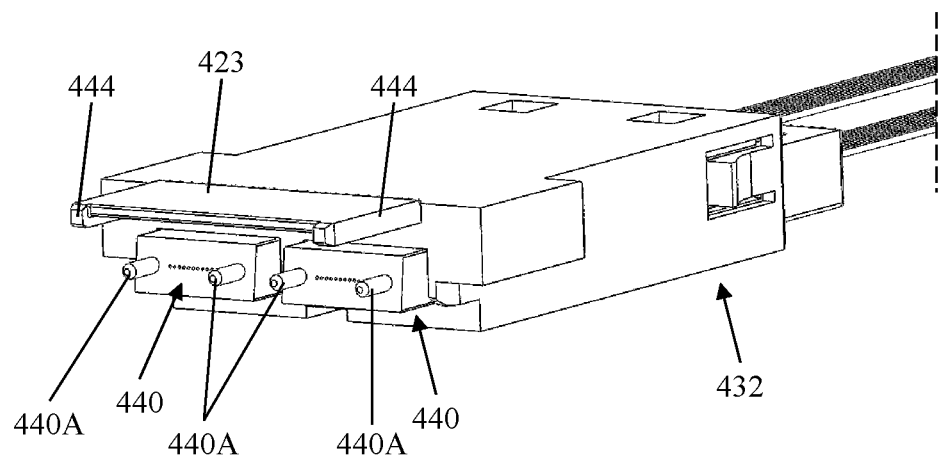
FIG. 50 is a perspective of a ferrule holder and ferrules of a receptacle connector assembly of the optoelectronic connection system of FIG. 47.
Figure 51:
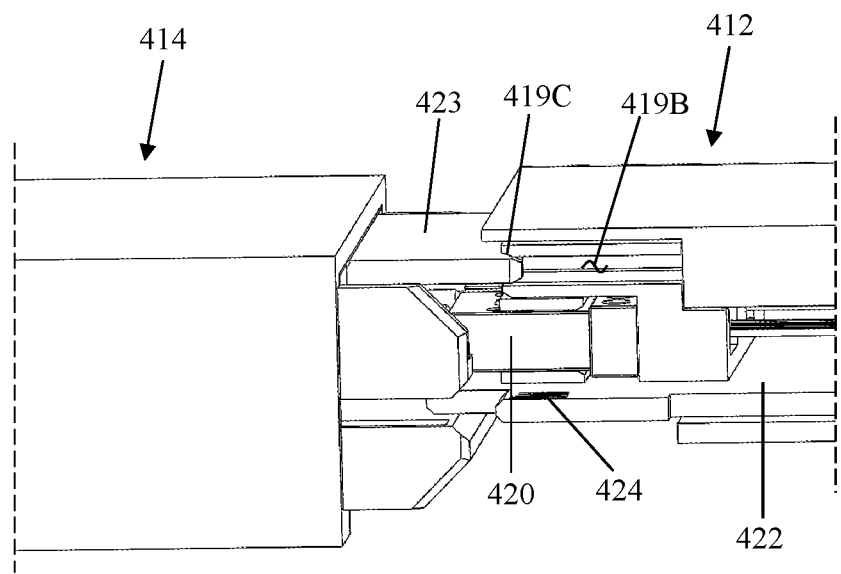
FIG. 51 is an enlarged, fragmentary perspective of the plug connector assembly and the receptacle connector assembly as they interengaged during a connection, with parts of the plug connector assembly broken away.

The ferrule holder 432 of the receptacle connector assembly 414 has essentially the same construction as the ferrule holder 332 of FIGS. 33-42. However, the guide fingers 444 of the ferrule holder 432 are interconnected by a bridge part 423 to form with the guide fingers a C-shaped alignment blade (FIG. 50). The bridge part 423 rigidifies the guide fingers 444 so that they do not undesirably bend upon engagement with a surface of the ferrule holder 418 of the plug connector assembly 412. The tips of the guide fingers 444 have the same bevels as described above for the FIGS. 33-42 embodiment. Connection of the plug connector assembly 412 with the receptacle connector assembly 414 is illustrated in FIG. 51. At the moment illustrated by FIG. 51, neither optical nor electrical connection has been made. However, the C-shaped alignment blade has just entered the C-shaped opening 419 of the ferrule holder 432 of the plug connector assembly 414. The angled surfaces 419C, 421A operate to guide the C-shaped alignment blade into the C-shaped opening 419, substantially as described in regard to the embodiment of FIGS. 33-42. The remainder of the connection process is identical to that described with respect to FIGS. 37-42 and will not be repeated.

Figure 52:
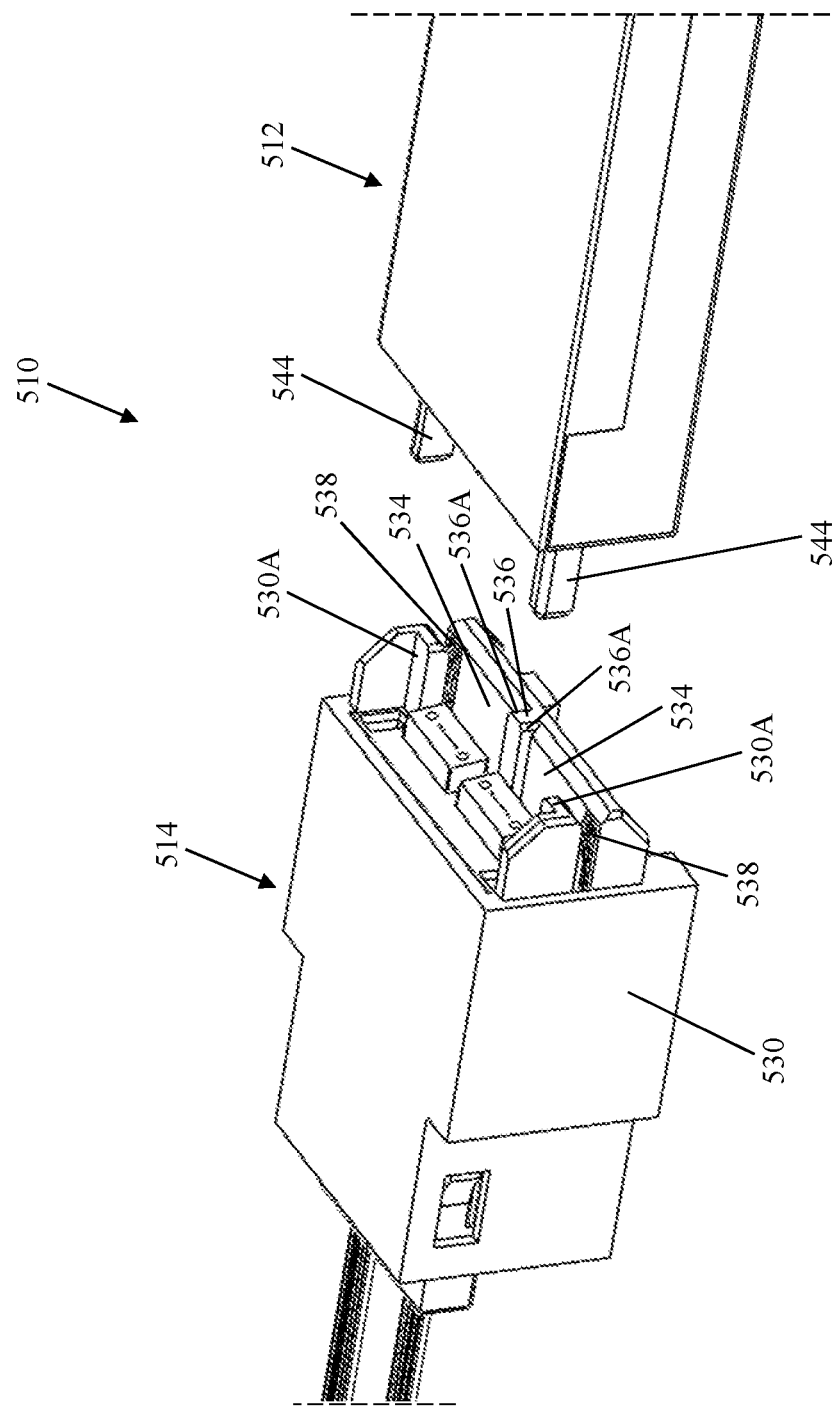
FIG. 52 is a fragmentary perspective of an optoelectronic connection system of yet another embodiment.
Figure 53:
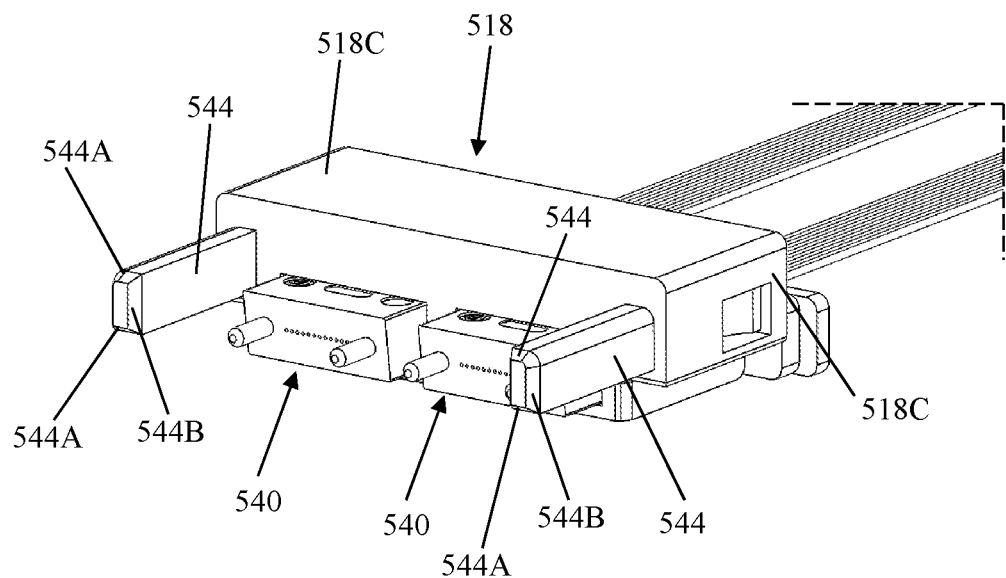
FIG. 53 is an enlarged perspective of a ferrule holder and ferrules of a plug connector assembly of the optoelectronic connection system of FIG. 52.
Figure 54:
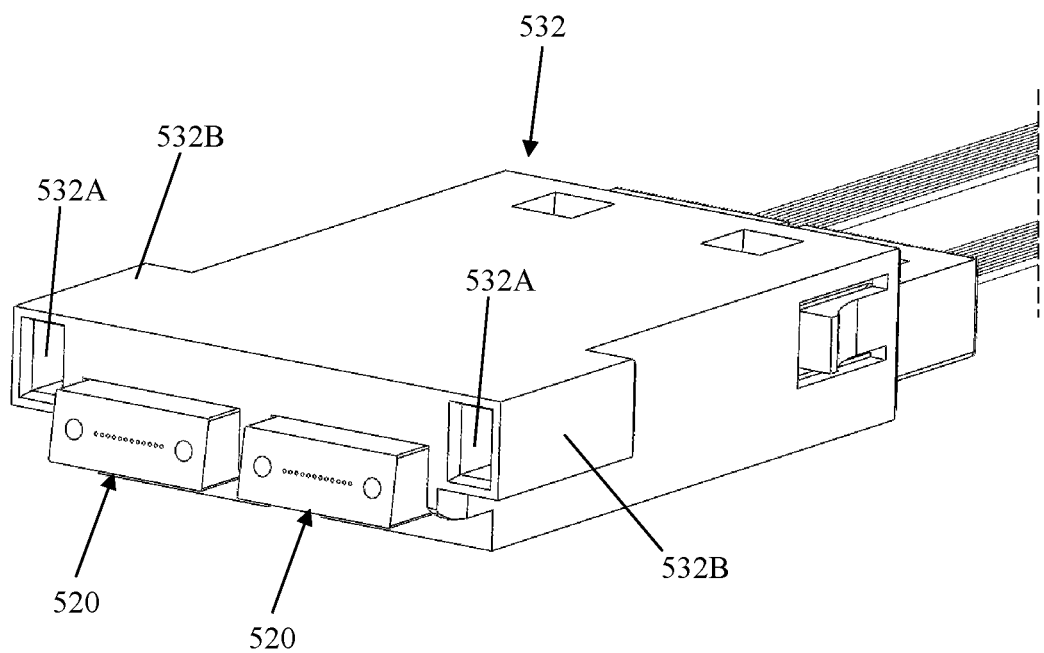
FIG. 54 is an enlarged perspective of a ferrule holder and ferrules of a receptacle connector assembly of the optoelectronic connection system of FIG. 52.

An optoelectronic connection system 510 of FIGS. 52-54 is another variant of the optoelectronic connection system 310 of FIGS. 33-42. Corresponding parts of the optoelectronic connection assembly 510 will be designated by the same reference numeral as for the optoelectronic connection assembly 310 of FIGS. 33-42, plus "200". The construction is essentially identical, except where noted below. Accordingly, the closely similar parts will not be separately described. As shown in FIG. 53, guide fingers 544 on a ferrule holder 518 of a plug connector assembly 512 are located on the wings 518C and are larger than the guide fingers 344 of the version shown in FIGS. 33-42. The free ends of each guide finger 544 has bevels 544A on the top and bottom, and also bevels 544B on both lateral sides. The guide finger 344 did not have a bevel on its interior side. Thus, the tip of each guide finger 544 has the shape of a frustum of a pyramid. As before, the tip of each guide finger 544 presents a smaller cross sectional area for initial engagement with a ferrule holder 532 of a receptacle connector assembly 514. The ferrule holder 532 of the receptacle connector assembly 514 includes corresponding alignment holes 532A in wings 532B of the ferrule holder. The alignment holes 532A are sized and positioned to receive the guide fingers 544 of the plug connector assembly ferrule holder 518. The periphery of the alignment holes 532A at the connection end of the ferrule holder 532 may include angled surfaces to help guide the guide fingers 544 into the alignment holes 532. The connection of the plug connector assembly 512 with the receptacle connector assembly 514 is substantially as described for the embodiment of FIGS. 33-42. It is noted that for this embodiment, the guide fingers 544 are on the plug connector assembly 512 and the alignment holes are on the receptacle assembly 518. This is the reverse of the embodiment of FIGS. 33-42. The positions of guide fingers and receiving alignment holes can be reversed in all embodiments of the present invention. In some embodiments, guide fingers having the construction shown in FIG. 53, can be connected together by a bridge part (not shown), substantially as shown in the embodiment of FIG. 50. In that case a mating ferrule holder would have a C-shaped opening similar to the C-shaped opening 419 shown in FIGS. 48 and 49, but sized and located to receive the guide pins having the size and location as shown in FIG. 53 in addition to the bridge part.

This disclosure is not limited to the particular systems, devices and methods described, as these may vary. The terminology used in the description is for the purpose of describing the particular versions or embodiments only, and is not intended to limit the scope.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. Moreover, orientation terms, such as "top, " "bottom," "side," etc. are used for convenience of description and do not require a particular orientation of the article described.

OTHER STATEMENTS OF INVENTION

An optical connector for selectively connecting to another optical device to achieve optical communication between the optical connector and the other optical device, the optical connector comprising a ferrule holder, a ferrule received in the ferrule holder, an optical fiber terminated in the ferrule so as to be presented for making optical connection with another optical device, and a spring received around the optical fiber and having a longitudinal axis, the spring comprising a spring wire formed with a plurality of turns extending around the longitudinal axis, each of the turns stopping short of extending 360° about the longitudinal axis to define a longitudinal gap extending a full length of the spring, the longitudinal gap being configured to move the spring on to an off of the optical fiber by passage of the optical fiber in a radial direction through the longitudinal gap in the spring.

A1. The optical connector as set forth in claim A wherein the longitudinal gap of the spring has a centerline that extends the full length of the spring and does not intersect the spring wire and any point.

A2. The optical connector as set forth in claim A wherein the spring wire comprises opposite first and second free ends, the spring wire extending from the first free end in a first of the turns to a switchback located on an opposite side of the longitudinal gap from the first free end.

A3. The optical connector as set forth in claim A2 further comprises plural switchbacks, each switchback being located between adjacent turns of the spring.

A4. The optical connector as set forth in claim A3 wherein the switchbacks are located on opposite sides of the longitudinal gap.

A5. The optical connector as set forth in claim A4 wherein each switchback is offset from other switchbacks on the opposite side of the longitudinal gap in a direction along the longitudinal axis of the spring.

A6. The optical connector as set forth in claim A further comprising a cable include the optical fiber and other optical fibers, the spring being movable onto and off of the cable by passage of the optical fiber in a radial direction through the longitudinal gap in the spring.

A7. The optical connector as set forth in claim A further comprising a backpost engageable with an end of the spring to compress the spring when the backposts are connected to the ferrule holder.

A8. The optical connector as set forth in claim A7 wherein the backpost has a channel-shape including a longitudinal opening, the backpost being movable onto and off of the cable by passing the cable through the longitudinal opening.

A9. The optical connector as set forth in claim A wherein the ferrule is a multi-fiber ferrule.

A10. The optical connector as set forth in claim A9 wherein the ferrule is a mechanical transfer ferrule.

A11. A method of incorporating a ferrule that has previously been connected to optical fiber from a cable into an optical connector in which the ferrule can resiliently move with respect to a ferrule holder of the optical connector, the method comprising the steps of:

inserting a spring onto the cable by moving the spring in a direction transverse to a lengthwise extent of the cable so that the cable passes through a longitudinal opening the spring to receive the spring on the cable;

moving a backpost onto the cable by moving the backpost in a direction transverse to then lengthwise extent of the cable so that the cable passes through a longitudinal opening in the backpost;

inserting the ferrule, spring and backpost into the ferrule holder through an open back end of the ferrule holder;

attaching the backpost to the ferrule holder to retain the ferrule and spring in the ferrule holder.

A12. The method of claim A11 wherein attaching the backpost to the ferrule holder comprises pushing the backpost into the ferrule holder until the backpost makes a snap connection to the ferrule holder.

A13. The method of claim A11 wherein inserting the ferrule, spring an backpost into the ferrule comprises moving the ferrule though the ferrule holding so that a front portion of the ferrule extends out of the ferrule holder on a front side of the ferrule holder.

B. An optoelectronic connection system comprising:

a first connector assembly including a first electrical contact, a ferrule holder, a multi-fiber ferrule supported by the ferrule holder, guide arms projecting from the ferrule holder and a latch release mechanism associated with the guide arms;

a second connector assembly including a housing configured to receive the first connector assembly for connection to the second connector assembly, a second electrical contact configured to electrically connect with the first electrical contact upon connection of the first and second connector assemblies, optical connection devices for optical connection with the multi-fiber ferrules, slots arranged for receiving the guide arms upon connection of the first and second connector assemblies; and a latch arm configured to lockingly engage the first connector assembly upon connection therewith;

the latch release mechanism being movable relative to the ferrule holder of the first connector assembly to displace the latch arm of the second connector assembly thereby to release locking engagement of the latch arm with the first connector assembly and allow the first connector assembly to be removed from the second connector assembly.

B1. An optoelectronic connection system as set forth in claim B wherein the multi-fiber ferrule is a first multi-fiber ferrule, and the ferrule holder is configured to hold the first multi-fiber ferrule and to hold a second multi-fiber ferrule in side-by-side relation with the first multi-fiber ferrule.

B2. An optoelectronic connection system as set forth in claim B1 wherein the first and second multi-fiber ferrules are mechanical transfer ferrules.

C. An optoelectronic connection system comprising:
a first connector assembly including a first electrical contact, a ferrule holder, a multi-fiber ferrule supported by the ferrule holder, guide arms projecting from the ferrule holder and a latch release mechanism associated with the guide arms;
a second connector assembly including a housing configured to receive the first connector assembly for connection to the second connector assembly, a second electrical contact configured to electrically connect with the first electrical contact upon connection of the first and second connector assemblies, optical connection devices for optical connection with the multi-fiber ferrules, slots arranged for receiving the guide arms upon connection of the first and second connector assemblies; and a latch arm configured to lockingly engage the first connector assembly upon connection therewith;
the latch release mechanism being movable relative to the guide arms and the latch arm to engage and deflect the latch arm from locking engagement with the first connector assembly thereby to permit disconnection of the first connector assembly from the second connector assembly.

What is claimed is:
1. An optoelectronic connection system comprising:
a first connector assembly including a housing, a first electrical contact, a ferrule holder, and a first multi-fiber ferrule supported by the ferrule holder, the housing having a opposite front and rear ends and an interior, the interior having an open front end at the front end of the housing, the first electrical contact and the first multi-fiber ferrule being disposed in the interior of the housing of the first connector assembly and both being accessible via the open front end of the interior of the housing of the first connector assembly, the first electrical contact located rearward of the open front end of the interior;
a second connector assembly including a housing configured to mate with the housing of the first connector assembly for connection to the second connector assembly, optical fibers in the housing configured for optical connection with the first multi-fiber ferrule, a second electrical contact configured to electrically connect with the first electrical contact upon connection of the first and second connector assemblies;
the first multi-fiber ferrule and the optical fibers of the second connector assembly being arranged relative to the first and second electrical contacts so that upon connection of the first connector assembly with the second connector assembly, the first multi-fiber ferrule makes an optical connection with the optical fibers of the second connector assembly prior to the first and second electrical contacts making an electrical connection.

2. The optoelectronic connection system as set forth in claim 1 wherein
the first multi-fiber ferrule and optical fibers of the second connector assembly are arranged relative to the first and second electrical contacts so that upon disconnection of the first connector assembly from the second connector assembly, the first multi-fiber ferrule and optical fibers of the second connector assembly break optical connection with each other after the first and second electrical contacts break electrical connection.

3. The optoelectronic connection system of claim 2 wherein
the second connector assembly further comprises a second multi-fiber ferrule terminating the optical fibers of the second connector assembly, the first connector assembly including a third multi-fiber ferrule and the second connector assembly a fourth multi-fiber ferrule, the third and fourth multi-fiber ferrules being arranged so that upon the connection of the first connector assembly with the second connector assembly, the third multi-fiber ferrule makes an optical connection with the fourth multi-fiber ferrule.

4. The optoelectronic connection system of claim 3 wherein
the first connector assembly further comprises a housing having an open front end, and a circuit board, the first electrical contacts being located on the circuit board at a location recessed from the front end of the housing.

5. The optoelectronic connection system of claim 1 wherein
the first connector assembly further comprising a housing and a coil spring yieldably biasing the ferrule holder out of the housing.

6. The optoelectronic connection system of claim 5 wherein
the coil spring permits movement of the first multi-fiber ferrule relative to the housing over a range.

7. The optical connector as set forth in claim 6 wherein the range of movement of the first multi-fiber ferrule relative to the housing is greater than 1 mm.

8. The optical connector as set forth in claim 7 wherein the range of movement of the first multi-fiber ferrule relative to the housing is at least about 2 mm.

9. The optical connector as set forth in claim 8 wherein the range of movement of the first multi-fiber ferrule at least about 4 mm.

10. The optoelectronic connection system of claim 5 wherein
the coil spring comprising a spring wire formed with a plurality of turns extending around the longitudinal axis, each of the turns stopping short of extending 360° about the longitudinal axis to define a longitudinal gap extending a full length of the spring.

11. The optoelectronic connection system of claim 1 wherein
the first electrical contact and the first multi-fiber ferrule of the first connector assembly are arranged and orientated relative to the optical fibers and the second electrical contact of the second connector assembly such that the optical connection and the electrical connection are both formed when the first connector assembly moves in a forward direction relative to the second connector assembly to connect the first and second connector assemblies.

12. The optoelectronic connection system of claim 11 wherein
the first multi-fiber ferrule faces in the forward direction.

13. The optoelectronic connection system of claim 1 wherein the first electrical contact and the first multi-fiber ferrule are disposed at a same end of the first connector assembly.

14. The optoelectronic connection system of claim 1 wherein
the housing of the first connector assembly includes a top wall and opposite left and right side walls extending down from the top wall, the top, left, and right side walls bounding the interior and the open front end of the interior.

15. The optoelectronic connection system of claim 1 wherein
the first connector assembly includes a circuit board, the first electrical contact being mounted on the circuit board, the circuit board being disposed in the interior of the housing of the first connector assembly, the circuit board disposed between the left and right side walls and spaced apart from the top wall.

16. The optoelectronic connection system of claim 15 wherein
the ferrule holder of the first connector assembly is supported by and rest on the circuit board of the first connector assembly.

17. The optoelectronic connection system of claim 16 wherein
the housing of the first connector assembly includes a bottom wall extending between the left and rights side wall and bounding the interior, the circuit board being supported by and resting on the bottom wall of the housing of the first connector assembly.

18. The optoelectronic connection system of claim 1, wherein the second connector assembly includes a resiliently deflectable latch arm configured for locking engagement with the housing of the first connector assembly upon connection of the first and second connector assemblies to secure the first and second connector assemblies together, the latch arm arranged to be displaced laterally outward by the housing of the first connector assembly to release the locking engagement of the latch arm with the housing of the first connector assembly and allow the first and second connector assemblies to be disconnected and arranged to be displaced laterally outward by the housing of the first connector assembly to permit the housing of the first connector assembly to move relative to the housing of the second connector assembly and allow the first and second connector assemblies to be connected.

19. The optoelectronic connection system of claim 1 wherein
the housing of the first connector assembly includes an opening in an exterior surface of the housing, and wherein the ferrule holder includes a portion extending into the opening of the housing of the first connector assembly.

20. The optoelectronic connection system of claim 1 wherein
the first multi-fiber ferrule being extends through the open front end of the interior of the housing of the first connector assembly.

* * * * *